(12) United States Patent
Lee et al.

(10) Patent No.: US 9,860,837 B2
(45) Date of Patent: Jan. 2, 2018

(54) METHOD FOR CHANGING OPERATING MODE OF WIRELESS LAN SYSTEM AND WIRELESS LAN SYSTEM

(71) Applicant: Electronics and Telecommunications Research Institute, Daejeon (KR)

(72) Inventors: Jae Seung Lee, Daejeon (KR); Hyoung Jin Kwon, Daejeon (KR); Min Ho Cheong, Daejeon (KR); Hee Jung Yu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 14/407,811

(22) PCT Filed: Jun. 13, 2013

(86) PCT No.: PCT/KR2013/005242
§ 371 (c)(1),
(2) Date: Dec. 12, 2014

(87) PCT Pub. No.: WO2013/187710
PCT Pub. Date: Dec. 19, 2013

(65) Prior Publication Data
US 2015/0173014 A1    Jun. 18, 2015

(30) Foreign Application Priority Data

Jun. 13, 2012  (KR) .................. 10-2012-0063369
Jul. 10, 2012  (KR) .................. 10-2012-0074860
(Continued)

(51) Int. Cl.
*H04W 52/02*    (2009.01)
*H04W 74/00*    (2009.01)
*H04W 84/12*    (2009.01)

(52) U.S. Cl.
CPC ..... *H04W 52/0216* (2013.01); *H04W 74/006* (2013.01); *H04W 84/12* (2013.01); *Y02B 60/50* (2013.01)

(58) Field of Classification Search
CPC .......... H04W 52/0216; H04W 74/006; H04W 84/12; H04W 52/0229; H04W 52/0206; H04W 74/00; H04W 24/02
See application file for complete search history.

(56) References Cited

U.S. PATENT DOCUMENTS 8,294,644 B2    10/2012  Marx et al.
9,485,716 B2 *  11/2016  Seok ............. H04W 48/14
(Continued)

FOREIGN PATENT DOCUMENTS

CN    1947357 A    4/2007
CN    1980190 A    6/2007
(Continued)

OTHER PUBLICATIONS

Dezhi Zhang et al., "Power saving mechanism consideration for 802.11ah framework", IEEE 11-11/1204r1, Sep. 18, 2011, pp. 1-9.
(Continued)

*Primary Examiner* — Jung-Jen Liu

(57) ABSTRACT

An operating mode change method of a wireless local area network (WLAN) system according to an exemplary embodiment includes transmitting, by a station (STA) to an access point (AP), an operating mode change request frame comprising at least one of information on a change of a traffic indication map (TIM) mode, a request for a change of a power save parameter, and information on a change of a
(Continued)

service type of the STA, receiving, from the AP, an operating mode change response frame comprising at least one of a TIM mode allowed by the AP, a reallocated association identification (AID), and information on a changed power save parameter, and performing at least one of the change of the TIM mode and the change of the power save parameter based on the information included in the operating mode change response frame.

18 Claims, 28 Drawing Sheets

(30) Foreign Application Priority Data

Sep. 11, 2012 (KR) .................. 10-2012-0100718
Jun. 13, 2013 (KR) .................. 10-2013-0067701

(56) References Cited

U.S. PATENT DOCUMENTS

| | | |
|---|---|---|
| 2005/0232200 A1 | 10/2005 | Jeong et al. |
| 2011/0110454 A1* | 5/2011 | Sampath .................. H04L 1/02 375/295 |
| 2012/0140755 A1 | 6/2012 | Hamdi |
| 2013/0235773 A1* | 9/2013 | Wang ................ H04W 52/0206 370/311 |
| 2013/0329620 A1* | 12/2013 | Kim ................ H04W 52/0229 370/311 |
| 2014/0177501 A1* | 6/2014 | Seok ................ H04W 52/0216 370/311 |
| 2014/0204821 A1* | 7/2014 | Seok ................ H04W 52/0206 370/311 |
| 2014/0211680 A1* | 7/2014 | Seok ................ H04W 52/0216 370/311 |
| 2014/0314054 A1* | 10/2014 | Seok ...................... H04W 8/26 370/336 |
| 2015/0078230 A1* | 3/2015 | Choi .................... H04W 74/04 370/311 |
| 2015/0181620 A1* | 6/2015 | Seok ..................... H04W 74/08 370/311 |
| 2016/0165534 A1* | 6/2016 | Kim ................ H04W 52/0229 370/311 |

FOREIGN PATENT DOCUMENTS

| | | |
|---|---|---|
| CN | 101262389 A | 9/2008 |
| KR | 10-2010-0133814 A | 12/2010 |
| WO | WO 2011/005062 A2 | 1/2011 |

OTHER PUBLICATIONS

Manthos Kazantzidis et al., "End-to-end versus Explicit Feedback Measurement in 802.11 Networks", Proceedings of the Seventh International Symposium on Computers and Communications (ISCC'02), 2002, pp. 1-6, IEEE Computer Society.
International Search Report for PCT/KR2013/005242 filed Jun. 13, 2013.

* cited by examiner

FIG. 4

| AH Action field value | Meaning |
|---|---|
| 0 | AH Operating Mode Notification |
| 1 | AH Operating Mode Change Request |
| 2 | AH Operating Mode Change Response |
| 3 ~ 255 | Reserved |

FIG. 5

| Order | Information |
|---|---|
| 1 | Category (set to AH) |
| 2 | AH Action (set to AH Operation Mode Notification) |
| 3 | Operating Mode field |

FIG. 7

| Order | Information |
|---|---|
| 1 | Category (set to AH) |
| 2 | AH Action (set to AH Operating Mode Change Request) |
| 3 | Operating Mode Change Request field |
| 4 | Optional Sub elements |

FIG. 10

| Bit 1 (EDCA) | Bit 2 (HCCA) | Bit 3 (Slotted) | Usage |
|---|---|---|---|
| 0 | 0 | 0 | Reserved |
| 1 | 0 | 0 | EDCA only |
| 0 | 1 | 0 | HCCA only |
| 0 | 0 | 1 | Slotted only |
| 1 | 1 | 0 | EDCA, HCCA mixed mode |
| 1 | 0 | 1 | EDCA, Slotted mixed mode |
| 0 | 1 | 1 | HCCA, Slotted mixed mode |
| 1 | 1 | 1 | EDCA, HCCA, Slotted mixed mode |

FIG. 11

| Bit 1 (EDCA) | Bit 2 (HCCA) | Bit 3 (Slotted) | Bit 4 (Other) | Usage |
|---|---|---|---|---|
| 0 | 0 | 0 | 0 | Reserved |
| 1 | 0 | 0 | 0 | EDCA only |
| 0 | 1 | 0 | 0 | HCCA only |
| 0 | 0 | 1 | 0 | Slotted only |
| 0 | 0 | 0 | 1 | Other method only |
| 1 | 1 | 0 | 0 | EDCA and HCCA mixed mode |
| 1 | 0 | 1 | 0 | EDCA and Slotted mixed mode |
| 0 | 1 | 1 | 0 | HCCA and Slotted mixed mode |
| 1 | 0 | 0 | 1 | EDCA and other method mixed mode |
| 0 | 1 | 0 | 1 | HCCA and other method mixed mode |
| 0 | 0 | 1 | 1 | Slotted and other method mixed mode |
| 1 | 1 | 1 | 0 | EDCA, HCCA, Slotted mixed mode |
| 0 | 1 | 1 | 1 | HCCA, Slotted, Other method mixed mode |
| 1 | 0 | 1 | 1 | EDCA, Slotted, Other method mixed mode |
| 1 | 1 | 0 | 1 | EDCA, HCCA, Other method mixed mode |
| 1 | 1 | 1 | 1 | EDCA, HCCA, Slotted, Other method mixed mode |

FIG. 12

| Element ID | Length (55) | TS Info | Nominal MSDU Size | Maximum MSDU Size | Minimum Service Size | Maximum Service Interval | Inactivity Interval | Suspension Interval |
|---|---|---|---|---|---|---|---|---|
| 1 | 1 | 3 | 2 | 2 | 4 | 4 | 4 | 4 |

Octet:

| Service Start Time | Minimum Data Rate | Mean Data Rate | Peak Data Rate | Burst Size | Delay Bound | Minimum PHY Rate | Surplus Bandwidth Allowance | Medium Time |
|---|---|---|---|---|---|---|---|---|
| 4 | 4 | 4 | 4 | 4 | 4 | 4 | 2 | 2 |

Octet:

FIG. 15

| Order | Information |
|---|---|
| 1 | Category (set to AH) |
| 2 | AH Action (set to AH Operating Mode Change Reponse) |
| 3 | AH Operating Mode Change Response field |
| 4 | Optional Sub elements |

FIG. 19

| Element ID | Length | STA Group ID | Slot No | Listen Interval | Max Idle Period | Idle Options | WNM-Sleep Interval | Other Subfields |
|---|---|---|---|---|---|---|---|---|
| 1 | 1 | 2 | 2 | 2 | 2 | 1 | 2 | var |

Octet:

METHOD FOR CHANGING OPERATING MODE OF WIRELESS LAN SYSTEM AND WIRELESS LAN SYSTEM

TECHNICAL FIELD

The present invention relates to a wireless local area network (WLAN) system and an operating mode change method of the WLAN system.

BACKGROUND ART

Wireless local area network (WLAN) technology is developing in three directions.

First, a 60-gigahertz (GHz) band and a 5-GHz band are used in a WLAN in order to enhance a transfer rate. Second, a frequency band of less than 1 GHz is used for a wireless wide area network (WWAN) uses to expand a coverage thereof as compared with conventional WLAN technology. Third, a technique of reducing a link setup time of a WLAN system is adopted.

A WWAN is required to accommodate a remarkably larger number of stations (STAs) than an established WLAN.

Further, WWAN technology may need to support STAs with various service types, such as offloading terminals and sensor terminals, traffic types, and power saving demands.

Therefore, a WWAN system is advancing to reduce collisions in channel access and to achieve efficient power saving by grouping a plurality of STAs.

DISCLOSURE OF INVENTION

Technical Goals

An aspect of the present invention is to provide an operating mode change method of conducting proper allocation of AIDs to a various types of stations (STAs), efficient STA group management, channel access, power saving and sector allocation so as to simultaneously support the STAs in a wireless local area network (WLAN) system, and a WLAN system using the same.

Further, another aspect of the present invention is to provide a frame structure and a communication method for exchanging various parameters to efficiently change an operating mode.

In addition, still another aspect of the present invention is to provide a method of enabling an operating mode change including a TIM/non-TIM mode change, a change of a service type of an STA and a BSS mode change, AID reallocation, an STA group change and a power save parameter.

Technical Solutions

According to an aspect of the present invention, there is provided an operating mode change method of a wireless local area network (WLAN) system, the method including transmitting, by a station (STA) to an access point (AP), an operating mode notification frame including information on a used bandwidth, information on a number of spatial streams, and information on a change of a traffic indication map (TIM) mode, receiving, from the AP, an operating mode change response frame including information on a reallocated association identification (AID) of the STA, and performing the change of the TIM mode based on the information included in the operating mode change response frame.

According to another aspect of the present invention, there is also provided an operating mode change method of a WLAN system, the method including transmitting, by a STA to an AP, an operating mode change request frame including at least one of information on a change of a TIM mode, a request for a change of a power save parameter, and information on a change of a service type of the STA, receiving, from the AP, an operating mode change response frame including at least one of a TIM mode allowed by the AP, a reallocated AID, and information on a changed power save parameter, and performing at least one of the change of the TIM mode and the change of the power save parameter based on the information included in the operating mode change response frame.

According to still another aspect of the present invention, there is also provided an operating mode change method of a WLAN system, the method including receiving, by an AP, an operating mode notification frame including information on a bandwidth used by an STA, information on a number of spatial streams, and information on a change of a TIM mode of the STA, determining whether to allow the change of the TIM mode of the STA, transmitting, to the STA, an operating mode change response frame including information on a reallocated AID of the STA, and receiving an acknowledgement (ACK) frame from the STA.

According to yet another aspect of the present invention, there is also provided an operating mode change method of a WLAN system, the method including receiving, by an AP, an operating mode change request frame including at least one of information on a change of a TIM mode of an STA, a request for a change of a power save parameter, and information on a change of a service type of the STA, determining whether to change the TIM mode of the STA and whether to change the power save parameter, determining an STA group to which the STA belongs based on the TIM mode of the STA to be changed, a power save parameter of the STA that the AP allows changing, and information on the service type of the STA and reallocating an AID based on a determination result, transmitting, to the STA, an operating mode change response frame including at least one information of a TIM mode allowed by the AP, the reallocated AID, and the changed power save parameter, and receiving an ACK frame from the STA.

According to further another aspect of the present invention, there is also provided an STA of a WLAN system, the STA including a transmission unit to transmit, to an AP, an operating mode notification frame including information on a used bandwidth, information on a number of spatial streams, and information on a change of a TIM mode, a reception unit to receive, from the AP, an operating mode change response frame including information on a reallocated AID of the STA, and a controller to perform the change of the TIM mode based on the information included in the operating mode change response frame.

According to still another aspect of the present invention, there is also provided an STA of a WLAN system, the STA including a transmission unit to transmit, to an AP, an operating mode change request frame including at least one of information on a change of a TIM mode of the STA, a request for a change of a power save parameter, and information on a change of a service type of the STA, a reception unit to receive, from the AP, an operating mode change response frame including at least one of a TIM mode allowed by the AP, a reallocated AID, and information on a changed power save parameter, and a controller to perform at least one of the change of the TIM mode and the change of the power save parameter based on the information included in the operating mode change response frame.

According to yet another aspect of the present invention, there is also provided an AP of a WLAN system, the AP including a reception unit to receive an operating mode notification frame including information on a bandwidth used by an STA, information on a number of spatial streams, and information on a change of a TIM mode of the STA, a controller to determine whether to allow the change of the TIM mode of the STA, and a transmission unit to transmit, to the STA, an operating mode change response frame including information on a reallocated AID of the STA.

According to still another aspect of the present invention, there is also provided an AP of a WLAN system, the AP including a reception unit to receive an operating mode change request frame including at least one of information on a change of a TIM mode of an STA, a request for a change of a power save parameter, and information on a change of a service type of the STA, a controller to determine whether to change the TIM mode of the STA and whether to change the power save parameter, to determine an STA group to which the STA belongs based on the TIM mode of the STA to be changed, a power save parameter of the STA that the AP allows changing, and information on the service type of the STA and to reallocate an AID based on a determination result, and a transmission unit to transmit, to the STA, an operating mode change response frame including at least one information of a TIM mode allowed by the AP, the reallocated AID, and the changed power save parameter.

Advantageous Effects

An operating mode change for efficient STA group management, channel access, power saving and sector allocation may be achieved in a wireless local area network (WLAN) system.

Further, an efficient operating mode change may be achieved through a frame structure and a communication method for exchanging various parameters to efficiently change an operating mode.

In addition, an operating mode change including a TIM/non-TIM mode change, a change of a service type of an STA and a BSS mode change, AID reallocation, an STA group change and a power save parameter change may be achieved.

Thus, exemplary embodiments of the present invention enable a basic service set (BSS) of a wireless wide area network (WWAN) to be efficiently managed.

BRIEF DESCRIPTION OF DRAWINGS

FIG. 4 illustrates definitions of action field values of a wireless local area network (WLAN) system according to an exemplary embodiment.

FIG. 5 illustrates an action field format of an operating mode notification frame according to an exemplary embodiment.

FIG. 7 illustrates a configuration of an action field format of an operating mode change request frame according to an exemplary embodiment.

FIG. 10 illustrates a use of an Access Policy subfield of FIG. 9.

FIG. 11 illustrates another use of the Access Policy subfield of FIG. 9.

FIG. 12 illustrates a TSPEC element in accordance with related technology.

FIG. 15 illustrates an action field format of an operating mode change response frame according to an exemplary embodiment.

FIG. 19 illustrates a configuration of a medium access parameter element according to another exemplary embodiment.

BEST MODE FOR CARRYING OUT THE INVENTION

Hereinafter, exemplary embodiments of the present invention are described in detail with reference to the accompanying drawings.

Figure 1:
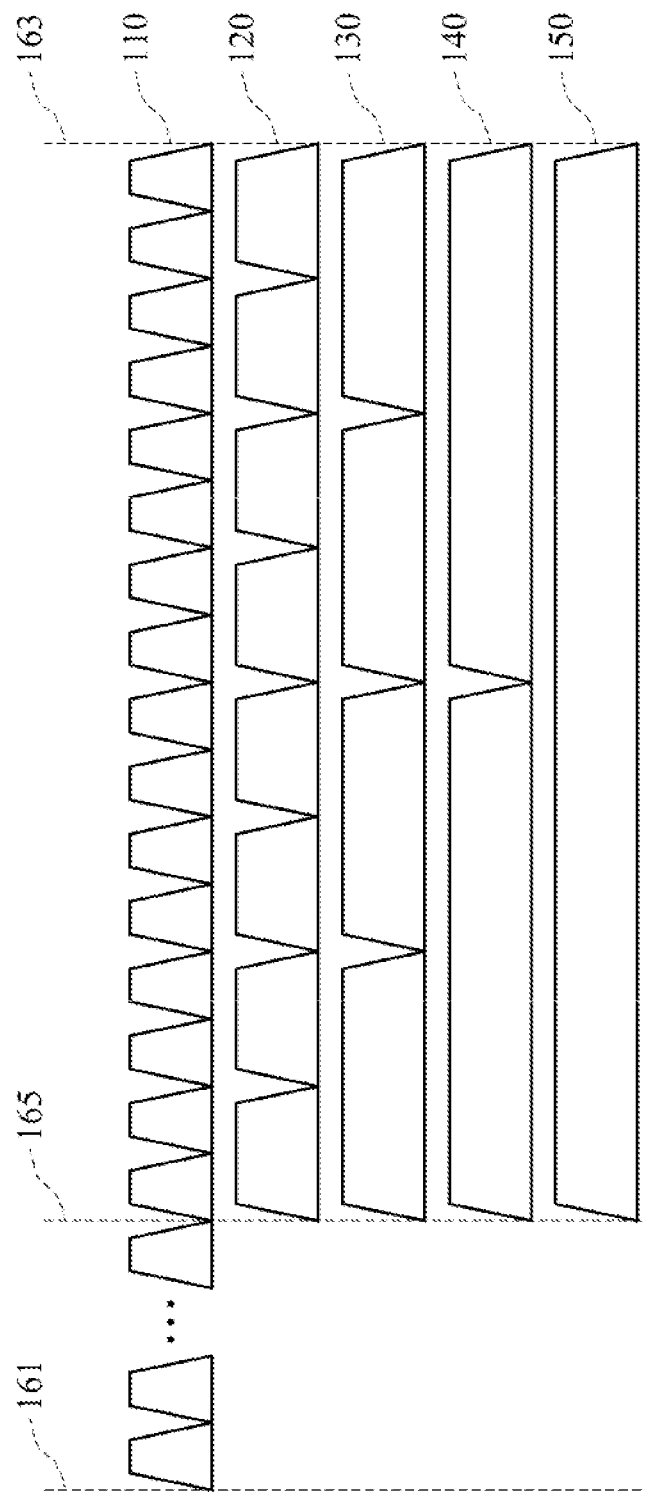
FIG. 1 illustrates a multi-bandwidth of a wireless wide area network (WWAN) system.

FIG. 1 illustrates a multi-bandwidth of a wireless wide area network (WWAN) system.

A WWAN system, for example, a wireless local area network (WLAN) system defined in an Institute of Electrical and Electronics Engineers (IEEE) 802.11ah standard, may support a multi-bandwidth. The multi-bandwidth may include a first bandwidth with a lowest signal-to-noise ratio (SNR) and a second bandwidth twice larger than the first bandwidth. Here, the first bandwidth is 1 megahertz (MHz).

Referring to FIG. 1, the multi-bandwidth may include a 1-MHz bandwidth 110, a 2-MHz bandwidth 120, a 4-MHz bandwidth 130, an 8-MHz bandwidth 140 and a 16-MHz bandwidth 150. The WWAN system may have a frequency band of 1 gigahertz (GHz) or less.

Thus, the multi-bandwidth may be expressed as including 1 MHz, 2 MHz, 4 MHz, 8 MHz, and 16 MHz.

Thus, in FIG. 1, a lower frequency 161 may range from 700 to 920 MHz, and an upper frequency 163 may range from 750 to 930 MHz.

As shown in FIG. 1, the 1-MHz bandwidth 110 may be allocated for an entire channel, while the other bandwidths 120, 130, 140, and 150 may be allocated for only part of the entire channel.

For example, the 16-MHz bandwidth 150 may be allocated between a reference numeral 163 of FIG. 1 and the upper frequency 163. Referring to FIG. 1, the 2-MHz bandwidth 120 may be allocated eight channels, the 4-MHz bandwidth 130 may be allocated four channels, and the 8-MHz bandwidth 130 may be allocated two channels. However, channel allocation shown in FIG. 1 is provided for illustrative purposes only, and a number of channels and a frequency band may be configured in various methods.

A transmission mode using the 1-MHz bandwidth 110 may be defined as a 1-MHz mode, while a transmission mode using the 2-MHz bandwidth 120 may be defined as a 2-MHz mode.

Figure 2:
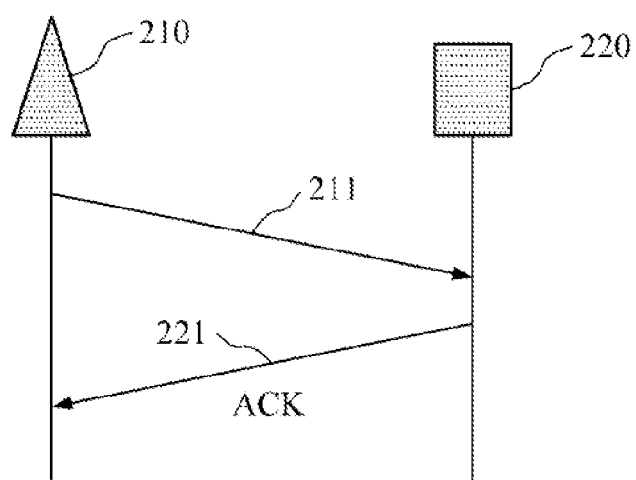
FIG. 2 illustrates an operating mode change method of an access point (AP) according to an exemplary embodiment.
Figure 3:
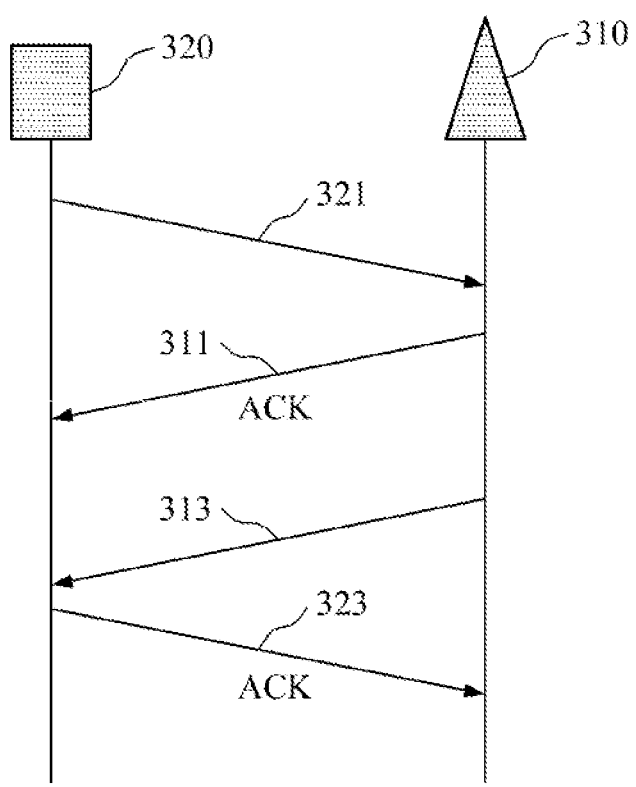
FIG. 3 illustrates an operating mode change method of a station (STA) according to an exemplary embodiment.

FIG. 2 illustrates an operating mode change method of an access point (AP) according to an exemplary embodiment. FIG. 3 illustrates an operating mode change method of a station (STA) according to an exemplary embodiment.

Referring to FIG. 2, an AP 210 of the WLAN system may notify an STA 220 of a change of an operating mode in operation 211.

Here, the AP 210 may broadcast an operating mode notification frame, thereby notifying the STA 220 of the change of the operating mode of the AP 210.

The AP 210 may change a bandwidth used by the AP 210, a number of spatial streams and a basic service set (BSS) mode. Here, the operating mode notification frame may include information on at least one of a bandwidth changed by the AP for use, a number of spatial streams, a change of the BSS mode, Rx Nss and an Rx Nss type. The Rx Nss and Rx Nss type will be described.

The STA 220 may transmit an acknowledgement (ACK) to the AP 210 in operation 221.

Referring to FIG. 3, the station 320 transmits an operating mode notification frame including information on a change of a used bandwidth, information on a change of a traffic indication map (TIM) mode, and information on a change of a number of spatial streams, for example, Rx Nss and Rx Nss type, to the AP in operation 321.

Here, the station 320 may conduct unicast of the operating mode notification frame. The information included in the operating mode notification frame may be added or changed variously.

The AP 310 receives the operating mode notification frame including the information on the change of the station used bandwidth, the information on the change of the TIM mode, and the information on a change of the number of spatial streams, for example, Rx Nss and Rx Nss type, in operation 321.

The AP 310 may transmit an ACK to the station 320 in operation 311.

The AP 310 may determine whether to allow the change of the TIM mode or the SAT 320, reallocate the STA to a different group for efficient station grouping in the BSS, and accordingly reallocate an association identification (AID) to the STA. In operation 313, the AP 310 transmits an operating mode change response frame including changed operating information of the STA, such as the reallocated AID of the STA 320.

When the change of the TIM mode is approved by the AP 310, the operating mode change response frame may further include group change information due to the change of the TIM mode. Further, when the STA is reallocated to a different group, the operating mode change response frame may further include power save parameters of the STA changed accordingly, such as a listen interval, a sleep duration, or a wakeup interval.

Here, the TIM mode may include an operation mode of not verifying the TIM transmitted from the AP and an operation mode of verifying the TIM transmitted from the AP at a preset time.

The STA 320 receives the operating mode change response frame from the AP 310 and changes an operation mode, for example, the TIM mode, a sleep duration or a wakeup interval, based on the information included in the operating mode change response frame.

Although not shown in FIG. 3, before transmitting the operating mode notification frame to the AP 310 or after changing the TIM mode, receiving an operating mode notification frame of the AP 310 including information on a change of an operating mode of the AP 310 from the AP 310 may be further included.

Here, the operating mode notification frame of the AP 310 may include information on whether the AP supports all types of stations, supports only a sensor node, or supports only an offloading device.

Meanwhile, as an alternatively method of requesting an operating mode change to the AP, the STA 320 may transmit an operating mode change request frame including information on the change of the TIM mode and information on a request for a change of a power save parameter to the AP 310 in operation 321.

The operating mode change request frame may further include at least one of information on a request for allocation of a sector supported by the AP 310, information on a traffic type of the STA and information on a service type that the station wishes to change.

The AP 310 determines whether to change the TIM mode of the STA and whether to change the power save parameter, determines a changed STA group to which the STA belongs based on a changed TIM mode of the STA and a changed power save parameter of the STA that the AP allows, traffic information of the STA or information on a changed service type, and accordingly reallocates an AID to the STA. In operation 313, the AP 310 may transmit an operating mode change response frame including at least one of the reallocated AID of the station 320 and the changed power save parameters of the STA, such as the listen interval, the sleep duration or the wakeup interval, to the station 320.

The operating mode change response frame may further include information on a TIM mode allowed by the AP 310, group change information due to the change of the TIM mode and a slot allocated to the STA 320.

The STA 320 may change at least one of the TIM mode and the power save parameters including the sleep duration and the wake up interval based on the information included in the operating mode change response frame.

The information on the request for the change of the power save parameter may include at least one of information on a request for a change of the listen interval of the STA 320, information on a request for a change of a maximum idle period, and information on a request for a change of the sleep duration, such as a wireless network management (WNM) sleep interval or the wakeup interval of the STA.

Although not shown in FIG. 3, before the STA 320 transmits the operating mode change request frame to the AP 310 or after the STA 320 performs the change, receiving an operating mode change response frame including information on a change of an operating mode of the AP from the AP 310 may be further included.

The AP may transmit an operating mode response to STAs as necessary in operation of a BSS of the AP without the STA explicitly requesting a change of the operating mode (if unsolicited), so that the STAs may change operation modes of the STAs. For example, when regrouping of STAs in the BSS is needed as a greater number of new STAs are associated with the AP or a great number of STAs leave the BSS, the STAs may be reallocated AIDs and relevant parameters including power save parameters may be changed if necessary. Further, STAs performing a sectorization function may be regrouped, and accordingly a sectorization group may be reallocated for STAs and a specific sector transmission duration may be changed. Without a request for a change of an operating mode from an STA (if un solicited), the AP may transmit an operating mode response to the STAs as necessary in operation of the BSS of the AP to send information on the reallocated AIDs, a changed power save parameter, a reallocated sector group of STAs due to a sector group change and a relevant sector transmission duration to the STAs, so that the STAs may change the operations modes thereof.

In the process of FIG. 3, the STA 320 may change the used bandwidth, the number of spatial streams and the TIM operation mode by transmitting the operating mode notification frame or an operating mode notification information element to the AP.

When the STA requests the change of the TIM operation mode or the change of the power save parameter or when the traffic type or service type of the STA is changed, the AP 310 determines a changed STA group to which the STA belongs based on a changed TIM mode of the STA and a changed power save parameter of the STA that the AP allows, and traffic information or information on a changed service type of the STA, reallocates an AID to the STA accordingly, and notifies the STA 320 of an operating mode change response frame including information on the reallocated AID and the changed power save parameter. Further, when the group of the STA 320 is changed or a slot allocated to the STA 320 for use is changed, the AP 310 may notify the STA 320 of an STA group ID and a slot number using the operating mode change response frame. In addition, when the AP changes the sector group of the STA, the AP may notify the STA 320 of a reallocated sector group, such as a sector ID or a group ID, and a sector transmission duration using the operating mode change response frame.

When slotted channel access operates in a manner of implicitly determining the STA group ID when the AID of the STA 320 is determined in the BSS and of reporting a slot number separately, the STA group ID and the slot number may not be included in the operating mode change response frame.

When the STA requests the change of the TIM mode by transmitting the operating mode notification frame to the AP, the AP 310 transmits the operating mode change response frame to the STA 320 to notify the STA of the operating mode of the STA changed by the AP when the change of the TIM mode is allowed.

The AP may reallocate a group for the STA based on the changed TIM mode, reallocate an AID to the STA accordingly, change a power save parameter of the STA if necessary, and notify the STA of operating mode information, such as the changed AID and the power save parameter through the operating mode change response frame. When the TIM operation mode is not changed, the AP 310 may not transmit the operating mode change response to the STA 320.

When the STA requests the change of the operation mode by transmitting the operating mode change request frame to the AP, the AP 310 transmits the operating mode change response frame to the STA 320 to notify the STA of the operating mode of the STA changed by the AP. The STA may notify the AP of more detailed information, such as the power save parameter, the service type or traffic type of the STA that the STA explicitly wishes to change, when the operating mode change request frame is transmitted to request the change of the operation mode than when the operating mode notification frame is transmitted.

The AP 310 transmits the reallocated AID of the STA 320 and the power save parameters, such as the listen interval of the STA 320 allowed by the AP, the maximum idle period or the sleep duration including the WNM sleep interval or the wakeup interval of the STA, to the STA 320 when transmitting the operating mode change response. In addition, when the change of the TIM mode is allowed so that the STA operates in a sectorization mode, the AP may further transmit operation mode information, for example, the reallocated sector group, such as the sector ID or group ID, and the sector transmission duration, to the STA 320.

When the STA transmits the operating mode notification frame to the AP to request the change of the TIM operation mode or when the STA transmits the operating mode change request frame to the AP, the STA 320 may need to receive the operating mode change response, verify the change of the operation mode and then enter a sleep state.

When the AP 310 does not allow the change of the operation mode requested by the STA 320, the AP 310 may report through the operating mode change response that the change is impossible.

For example, when the STA 320 wishes to change the TIM mode from non-TIM to TIM, the AP 310 may not allow the change. Here, the AP 310 may respond with the non-TIM mode through an operating mode change response, instead of the TIM mode requested by the STA 320.

The STA 320 may use an operating mode notification element included in a beacon frame, a probe response or an association response when the STA 320 first enters the BSS and verifies the operation mode of the AP 310.

The STA may specify an operating mode desired by the STA, for example, a TIM mode, a desired channel bandwidth and a desired number of spatial streams, in the operating mode notification element, includes the operating mode notification element in an association request frame, and transmit the association request frame to the AP when the STA is associated with the AP. The AP 310 may verify the desired operating mode of the STA through the operating mode notification element included in the association request. The AP 310 may reject the association of the STA 320 when the AP 310 does not support the operating mode desired by the STA 320, for example, a non-TIM operation.

The STA may notify the AP of the operating mode desired by the STA by including a medium access preference element, which will be mentioned, in the association request frame, in addition to the operating mode notification element. The medium access preference element is an element including similar information to operation mode change information on the STA included in the operating mode change request frame. When the medium access preference element is included in the association request frame, the STA may notify the AP of an STA-desired TIM mode, power save parameters including a sleep duration, such as a listen interval or wakeup interval, a traffic type or service type of the STA and a sector ID of a preferred sector at association time, and the AP may determine whether to allow association of the STA based on the element and set up a mode of the STA at association time.

When the STA transmits mode setup information, such as the operating mode notification element or the medium access preference element, to the AP through the association request, the AP may include a medium access parameter element, which will be described, as mode setup information on the STA in an association response frame for transmission to the STA when transmitting an association response to the STA, so that the STA may set up an initial operating mode in the BSS. The medium access parameter element is an element including similar information to operation mode change information of the STA included in the operating mode change response frame allowed by the AP. When the medium access parameter element is included in the association response, the STA may recognize a TIM mode of the STA allowed by the AP at association time, an AID of the STA, power save parameters including a sleep duration, such as a listen interval or wakeup interval, an allocated sector group of the STA, such as a sector ID or sector group ID, if the STA uses sectorization, and duration information on a relevant sector and immediately set up an operating mode at association time based on the element.

The STA 320 may transmit information not only on the change of the TIM mode but also on a request for AID reallocation, a request for a change of an STA group, a service type or traffic type of the STA, sector allocation or sector reallocation to the AP 310 using the operating mode change request frame in operation 321.

The AP 310 may transmit a reallocated AID and information on a sector group allocated for the STA, such as a sector ID or sector group ID, to the STA 320 in operation 313. Here, when the STA 320 explicitly requests a change of power save parameters including a sleep duration, such as a listen interval or wakeup interval, or when the AP determines that a change of power save parameters is needed based on the information on the traffic type or service type of the STA and the information on the request of the change of the TIM mode without an explicit request by the STA, the AP 310 may transmit the power save parameters allocated by the AP including the sleep duration, such as the listen interval or wakeup interval, to the STA 320 and the STA 320 may change the operating mode as far as the AP permits.

The AP 310 transmits the reallocated AID of the STA 320 and the power save parameters, such as the listen interval of the STA 320 allowed by the AP, the maximum idle period, the WNM sleep interval or the sleep duration including the wakeup interval of the STA, to the STA 320 when transmitting the operating mode change response. Further, when the change of the TIM mode is allowed so that the STA operates in a sectorization mode, the AP may further transmit operation mode information, for example, the reallocated sector group, such as the sector ID or group ID, and the sector transmission duration, to the STA 320.

Here, the STA 320 transmits the operating mode change request, receives the operating mode change response, verifies the changed operating mode thereof, and then enters the sleep state.

When the AP 310 does not allow the power save parameters, such as the listen interval, the maximum idle period, the WNM sleep interval or the sleep duration including the wakeup interval of the STA, and the sector group as requested by the STA 320, the AP 310 may notify the STA 320 of allowable power save parameters, such as a listen interval, a maximum idle period, a WNM sleep interval or a sleep duration including a wakeup interval of the STA, and an allocated sector group through the operating mode change response.

The STA 320 may change the operating mode using values allowed by the AP 310.

The AP may transmit an operating mode response to STAs as necessary in operation of a BSS of the AP without the STA explicitly requesting a change of the operating mode (if unsolicited), so that the STAs may change operation modes of the STAs. For example, when regrouping of STAs in the BSS is needed as a greater number of new STAs are associated with the AP or a great number of STAs leave the BSS, the STAs may be reallocated AIDs and relevant parameters including power save parameters may be changed if necessary. Further, STAs performing a sectorization function may be regrouped, and accordingly a sectorization group may be reallocated for STAs and a specific sector transmission duration may be changed. Without a request for a change of an operating mode from an STA (if un solicited), the AP may transmit an operating mode response to the STAs as necessary in operation of the BSS of the AP to send information on the reallocated AIDs, a changed power save parameter, a reallocated sector group of STAs due to a sector group change and a relevant sector transmission duration to the STAs, so that the STAs may change the operations modes thereof.

The operating mode change methods described in FIGS. 2 and 3 may be illustrated with reference to FIGS. 22 to 28.

Figure 22:
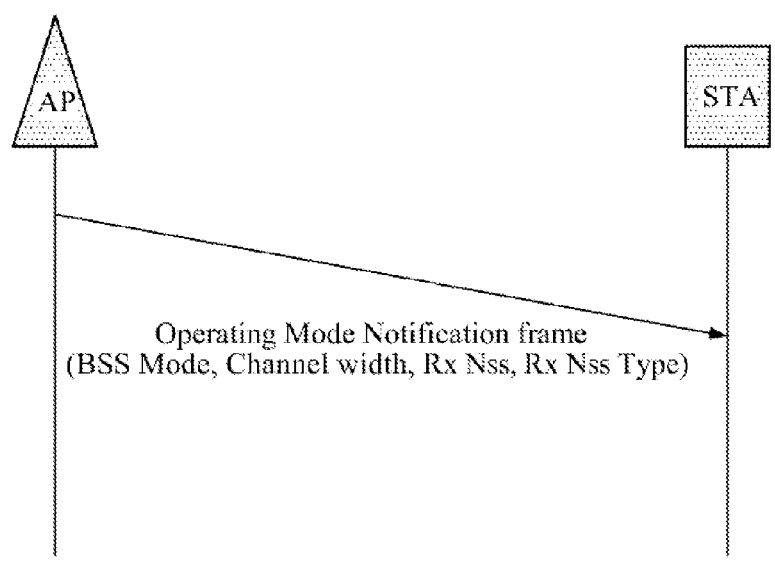
FIGS. 22 to 28 illustrate various examples of operation mode change methods of an AP or a STA.

FIG. 22 is an example illustrating that the AP reports a change of an operating mode thereof using an AH operating mode notification frame.

Figure 23:
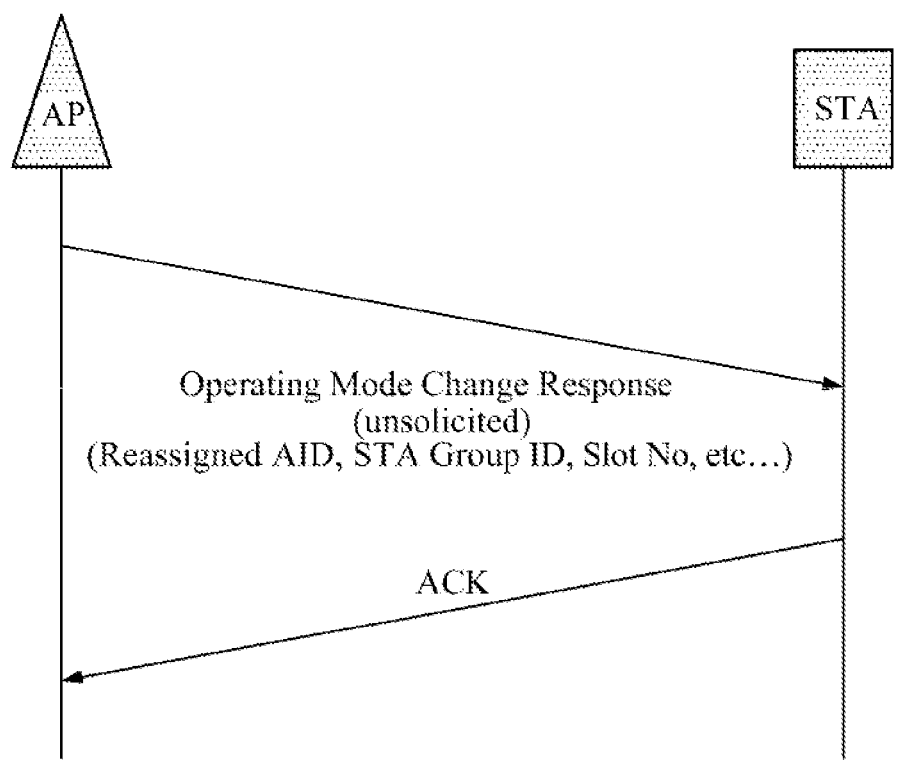

FIG. 23 is an example illustrating that the AP notifies the STA of an AID, an STA group, slot allocation, and sector allocation using an operating mode change response frame. Here, the operating mode change response frame may be transmitted if necessary during an operation of a BSS of the AP without a request for a change of the operating mode from the STA.

Figure 24:
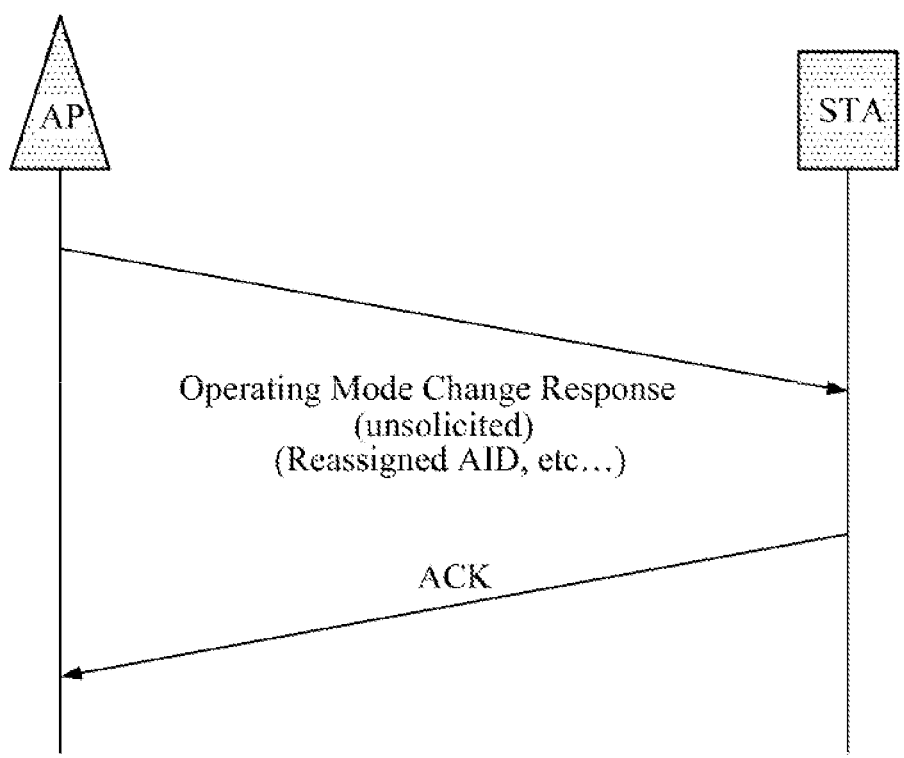

FIG. 24 is an example illustrating that the AP notifies the STA of AID allocation using an operating mode change response frame. Here, FIG. 24 shows a method of implicitly determining an STA group ID when an AID of the STA is determined in a BSS and of reporting a slot number separately.

Figure 25:
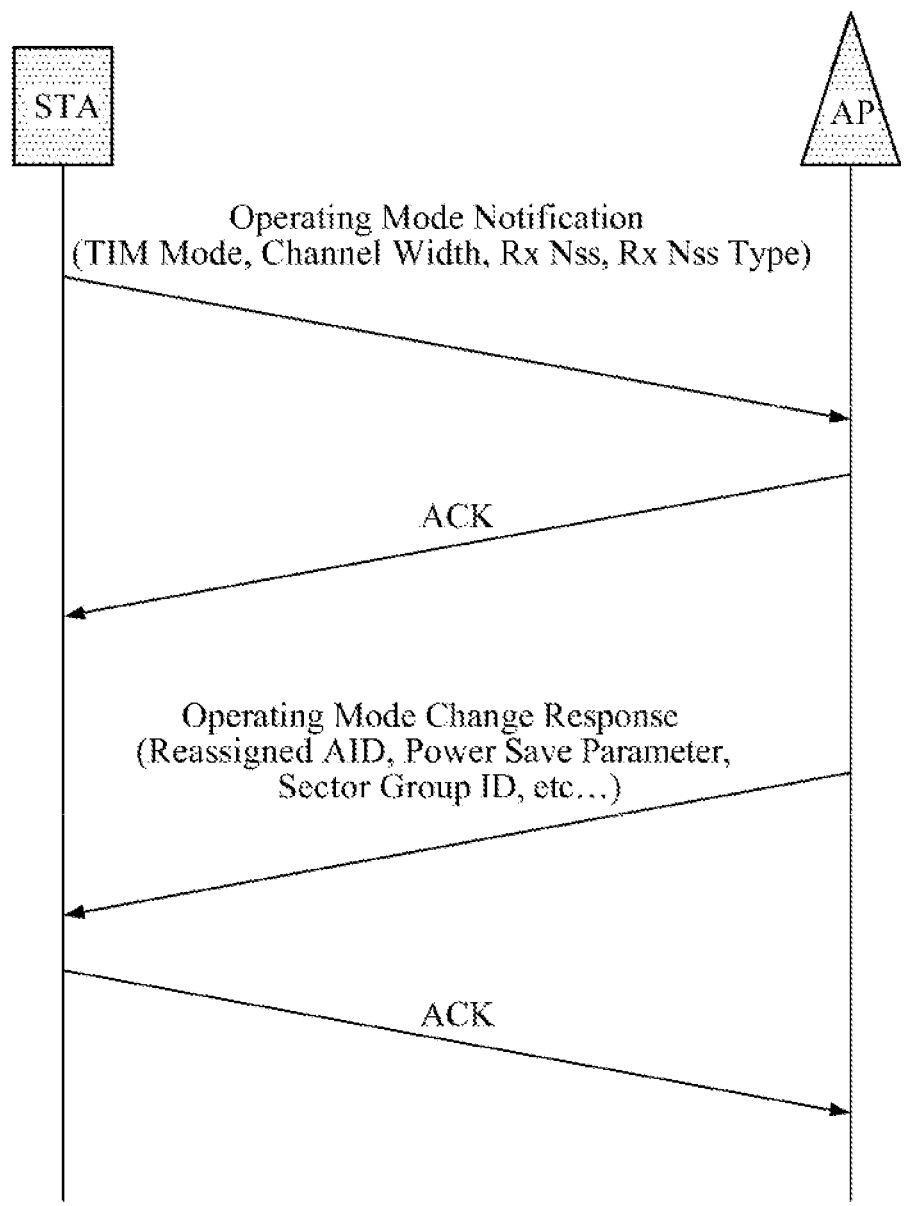

FIG. 25 is an example illustrating a change of an operation mode of the STA using an operating mode notification frame. Here, an operating mode change response may be transmitted when the TIM Mode is changed.

Figure 26:
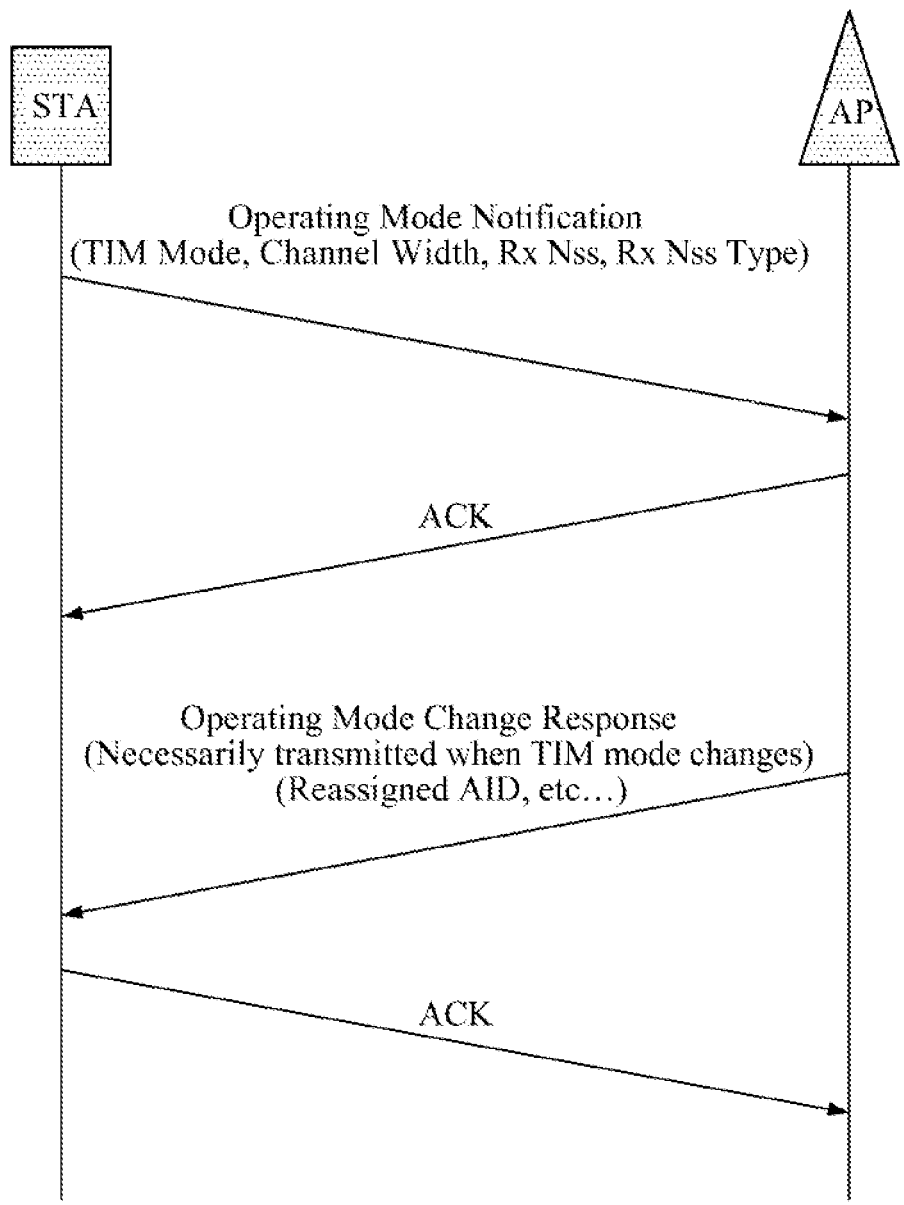

FIG. 26 is another example illustrating a change of an operation mode of the STA using an operating mode notification frame. Here, an operating mode change response is necessarily transmitted when the TIM mode is changed.

Figure 27:
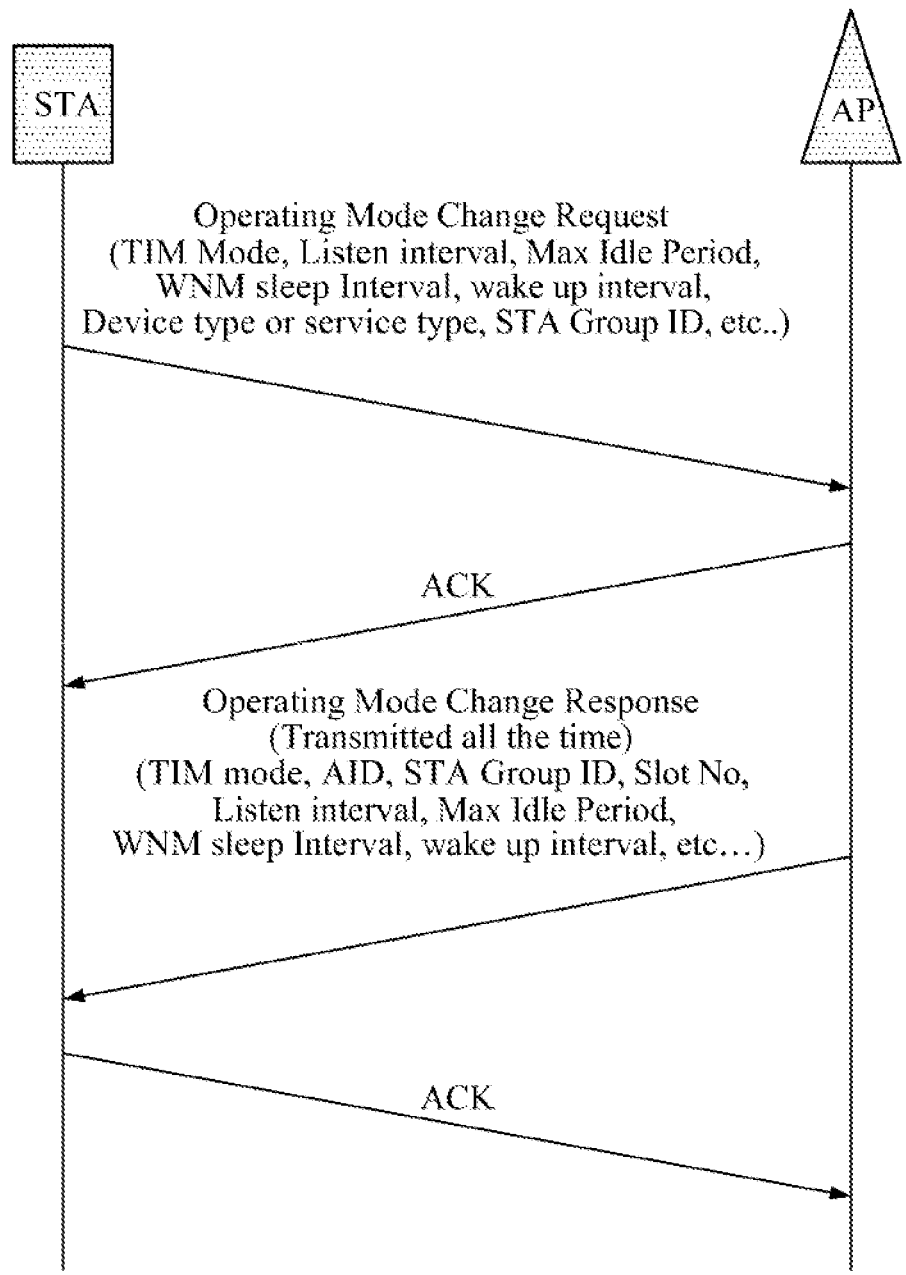

FIG. 27 is an example illustrating that the STA changes an operation mode thereof using an operating mode change request frame and an AH operating mode change response frame. Here, an operating mode change response is always transmitted regardless of a change of the TIM mode.

Figure 28:
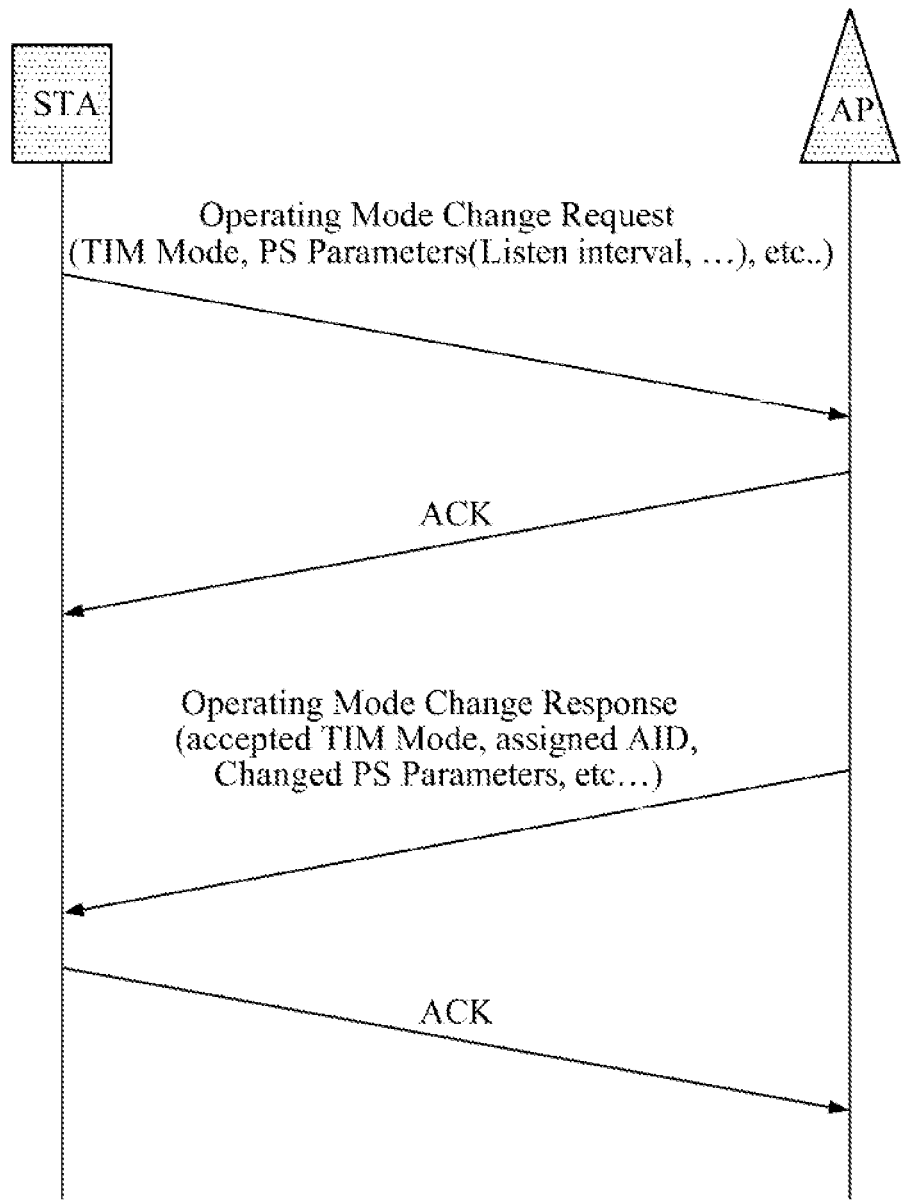

FIG. 28 is another example illustrating that the STA changes an operation mode thereof using an operating mode change request frame and an AH operating mode change response frame.

Hereinafter, various frames to be used for changing an operating mode will be described with reference to FIGS. 4 to 19.

FIG. 4 illustrates definitions of action field values of the WLAN system according to an exemplary embodiment.

In the specification, a term including "AH" may be used to indicate technology applicable to an 802.11ah WLAN system.

For an operating mode change, an AH operating mode notification frame, an AH operating mode change request frame and an AH operating mode change response frame may be used.

The AH operating mode notification frame, the AH operating mode change request frame and the AH operating mode change response frame may be defined as AH action field values in FIG. 4. Here, it is an illustrative example that a frame for changing the operating mode is defined as an action frame, and a frame in a different form including similar information may be also used.

FIG. 5 illustrates an action field format of an operating mode notification frame according to an exemplary embodiment.

An operating mode notification frame and an operating mode notification element may be used to notify the STA of an operating channel width and a maximum number of spatial streams for reception. The WWAN system may support a non-TIM operation mode and also support a BSS mode formed of sensor nodes only, a BSS mode formed of offloading devices only, and a BSS mode formed of combinations thereof.

The operating mode notification frame and the operating mode notification element may report the non-TIM operation mode and a BSS mode formed of specific STAs only, for example, the BSS mode formed of sensor nodes only, the BSS mode formed of offloading devices only and the BSS mode formed of combinations thereof, thereby supporting TIM/non-TIM mode conversion and conversion between different types of BSS mode.

Figure 6:
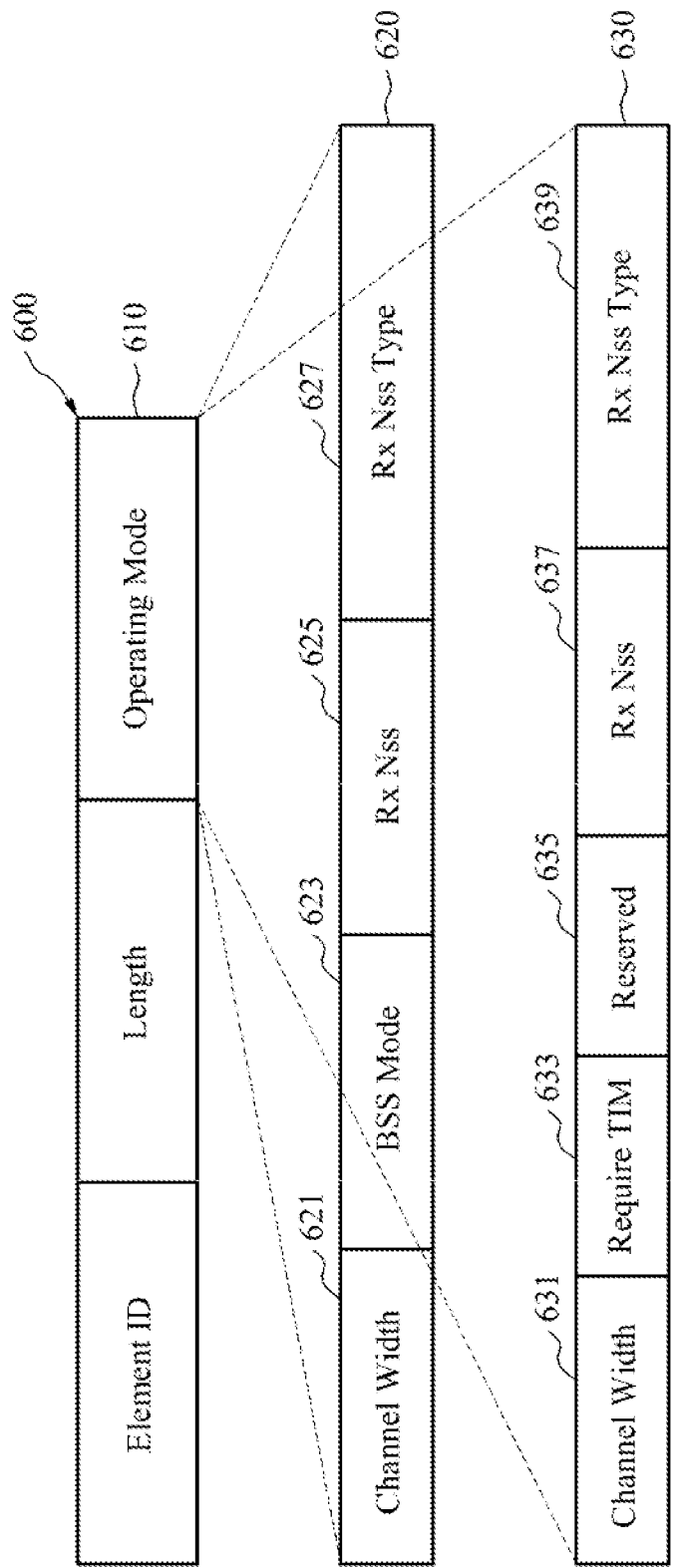
FIG. 6 illustrates a format of an operating mode notification element according to an exemplary embodiment.

FIG. 6 illustrates a format of an operating mode notification element according to an exemplary embodiment.

Referring to FIG. 6, an AH operating mode notification element 600 may include an operating mode field 610.

The operating mode field 610 has the same value as an operating mode field of the AH operating mode notification frame. The AH operating mode notification element may be included in a beacon, an association request, an association response and a probe response and be used for the STA to notify the AP of the operating mode of the STA when the STA first enters the BSS and also used for the AP to notify the STA of the operating mode of the AP.

The AH operating mode notification frame may be used for the STA to notify a particular AP of a change of the operating mode of the STA, maintaining association with the AP after the STA is associated with a particular AP, or be used for the AP to notify STAs associated with the AP of a change of the operating mode of the AP.

The operating mode fields 610 of the AH operating mode notification element and the AH operating mode notification frame may be defined as in 620 or 630 in FIG. 6. The configurations defined in 620 and 630 are provided for illustrative purposes only, and a frame in a different format including similar information may be also used, with different field lengths and orders.

Two bits following channel widths 621 and 631 may be interpreted differently in transmission from the AP to the STA from in transmission from the STA to the AP.

The operating mode field format 620 transmitted from the AP to the STA may include the channel width 621 indicating information on a channel bandwidth used by the AP, a BSS mode 621 indicating information on a BSS mode, a number of spatial streams Rx Nss 625 indicating a number of spatial streams received by the AP, and an Rx Nss type 627 indicating information on an Rx Nss type.

The operating mode field format 630 transmitted from the STA to the AP may include the channel width 631 indicating information on a channel bandwidth used by the STA, a Require TIM 633 indicating information on a TIM mode that the STA requires to change, a Reserved 635 indicating an undefined field for further availability, a number of spatial streams Rx Nss 637 indicating a number of spatial streams received by the STA, and an Rx Nss type 639 indicating information on an Rx Nss type.

The channel width 621 and the channel width 631 may indicate the information on the channel bandwidths supported by the AP and the STA.

Hereinafter, functions and illustrative values of the respective fields are described regardless of reference numerals of the fields.

<Channel Width>

Channel width values may be defined as in Table 1.

TABLE 1

Set to 0 for 1 MHz
Set to 1 for 2 MHz
Set to 2 for 4 MHz
Set to 3 for 8 MHz
Set to 4 for 16 MHz
Set to 5 to 7: Reserved <Rx Mss>

If the Rx Nss Type subfield is 0, Rx Nss indicates the maximum number of spatial streams that the STA can receive. If the Rx Nss Type subfield is 1, Rx Nss indicates the maximum number of spatial streams that the STA can receive as a beamformee in an SU PPDU using a beamforming steering matrix derived from a VHT Compressed Beamforming report with Feedback Type subfield indicating MU in the VHT Compressed Beamforming frame(s).

Rx Nss values may be defined as in Table 2.

TABLE 2

Set to 0 for Nss = 1
Set to 1 for Nss = 2
Set to 2 for Nss = 3
Set to 3 for Nss = 4

<Rx Nss Type>

If the Rx Nss Type is 0, the Rx Nss subfield may indicate a maximum number of spatial streams that the STA can receive. If the Rx Nss Type is 1, Rx Nss indicates the maximum number of spatial streams that the STA can receive as a beamformee in an SU PPDU using a beamforming steering matrix derived from a VHT Compressed Beamforming report with Feedback Type subfield indicating MU in the VHT Compressed Beamforming frame(s).

<BSS Mode>

The BSS Mode may be used to report the BSS mode of the AP.

A BSS may be operated in a form of a mixed mode BSS supporting all STAs, sensor only BSS supporting sensor nodes only, or offloading only BSS supporting offloading devices only. Field values to distinguish the BSS modes may be defined as in Table 3.

TABLE 3

Set to 0 for Sensor only BSS
Set to 1 for Offloading only BSS
Set to 2 for Mixed Mode BSS
3: Reserved (extendable to further support different types of BSS)

When STAs associated with the AP during operation in a mixed mode BSS are all sensor nodes or offloading STAs, the AP may change the operation mode of the AP to the sensor only BSS or offloading only BSS. In the changed mode, a frame and a protocol sequence optimized for the mode may be used to minimize communication overhead.

To change to the mixed mode BSS from operation in the sensor only BSS or offloading only BSS so as to support various devices, the AP may verify capability of an STA currently in association, and change to the mixed mode BSS only when all STAs currently in association with the AP are able to operate.

<Require TIM>

A sensor node may select an operation mode not involving verification of a TIM even without listening to a beacon in order to save power for a long time. The STA, which is operating in the non-TIM operation mode not involving verification of a TIM, may need to change to the TIM operation mode as an operation mode involving verification of a TIM of a beacon in case of emergency or a request for bursty traffic transmission.

Also, the STA may need to change from the TIM operation mode to the non-TIM operation mode, for example, when power is needed. To support the change of the TIM operation, maintaining association, the STA may notify the AP of the operation mode using a Require TIM bit. The change of the operation mode is reported, for instance, as follows.

Set to 1 for STA to operate in TIM Operation
Set to 0 for STA to operate in non-TIM Operation When the STA changes the operation mode between the TIM operation mode and the non-TIM operation mode, an operation pattern of the STA, such as a listen interval and a wakeup interval of the STA, may change. Thus, the AP changes a group for the STA based on the operation pattern of the STA changed on the change of the operation mode so that the STA belongs to a different group of STAs having similar operation patterns in order to optimize BSS management, reallocate an AID for the STA, and change the power save parameters of the STA, such as the listen interval and the wakeup interval.

When the TIM operation mode of the STA is changed, the AP may perform a change of the group of the STA and AID reallocation and notify the STA of changed operating information on the STA using an operating mode change response frame including the changed operating information, for example, reallocated AID information. Further, the operating mode change response may further include power save parameters of the STA properly changed for the change of the TIM operation mode or group reallocation for the STA, for example, a listen interval, a sleep duration, or a wakeup interval.

FIG. 7 illustrates a configuration of an action field format of an operating mode change request frame according to an exemplary embodiment.

A mode change method using an operating mode notification frame and a mode change method using an AH operating mode change request and an AH operating mode change response may be used simultaneously.

An Operating Mode Change Request field may include information needed for the STA to make a request for an operating mode change to the AP.

The Operating Mode Change Request field may include a request of the STA for a TIM/non-TIM operation mode change and a request of the STA for a change of power save parameters including sleep interval information, such as a listen interval, a maximum idle period, a WNM-sleep interval or a wakeup interval.

The Operating Mode Change Request field may also include sector allocation request information, for example, a group number or ID of an optimal sector to which the STA wishes to belong, and traffic type information on the STA for reference for the AP to reallocate an AID to the STA, for example, estimated amount of traffic of the STA, periodicity of the traffic and whether the STA conducts uplink-oriented transmission or down-oriented transmission.

In addition, the Operating Mode Change Request may include service type information on the STA, for example, information on whether the STA is a sensor node sleeping for a long time, a sensor node comparatively frequently waking up, a sensor node waking up event-driven or periodically, an offloading device, a device using a streaming service, or a device using a VoIP service.

Figure 8:
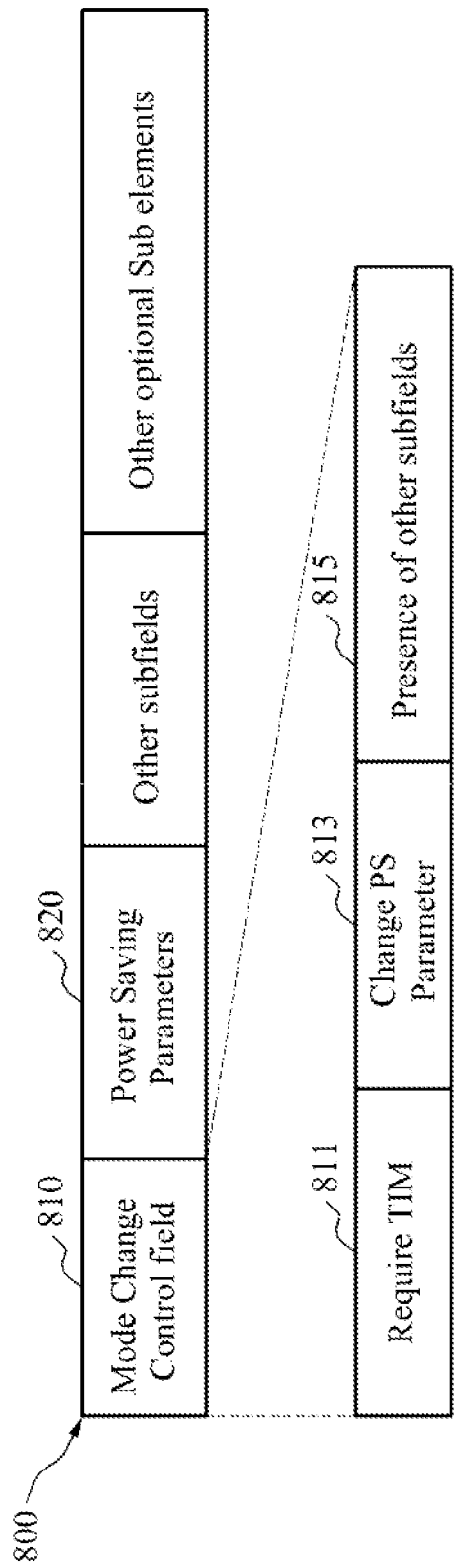
FIG. 8 illustrates a configuration of an operating mode change request field according to an exemplary embodiment.

FIG. 8 illustrates a configuration of the Operating Mode Change Request field according to an exemplary embodiment.

Referring to FIG. 8, an operating mode change request frame 800 may include Mode Change Control field 810 and Power Saving Parameters 820.

Mode Change Control field 810 may include a Require TIM 811, a Change PS Parameter 813 and a Presence of other subfields 815.

Power Saving Parameters 820 may indicate requested changes of power save parameters, such as a listen interval, a maximum idle period or sleep interval information of the STA including a WNM-sleep interval or a wakeup interval.

Other subfields or Other optional Sub elements may include traffic type information on the STA for reference for the AP to reallocate an AID of the STA, for example, estimated amount of traffic of the STA, periodicity of the traffic and whether the STA conducts uplink-oriented transmission or down-oriented transmission.

Further, Other subfields may include service type/device type information on the STA, for example, information on a battery-powered sensor node or a sensor node connected to a power source, a battery-powered notebook or a notebook connected to a power source, a sensor node sleeping for a long time, a sensor node comparatively frequently waking up, a sensor node waking up event-driven or periodically, an offloading device, a device using a streaming service, or a device using a VoIP service.

Other subfields may also include sectorization information, for example, optimal sector selection information including a sector group ID or sector ID, the optimal sector selection information as information for selection of an optimal sector to which the STA wishes to be allocated being discovered by the STA through a sector beacon/NDP type discovery frame of the AP and being reported by the STA to the AP for sectorization of the STA.

Mode Change Control field 810 may indicate whether the STA wants the TIM operation or the non-TIM operation and whether the operating mode change request frame includes a request for a change of power save parameters, such as a listen interval change, a maximum idle period change, a WNM-sleep interval change, or a wakeup interval change.

Operating Mode Change Request field may include information on a traffic type, device type or service type of the STA. Also, the Operating Mode Change Request field may include information on a request of the STA for sector allocation or sector change.

Figure 9:
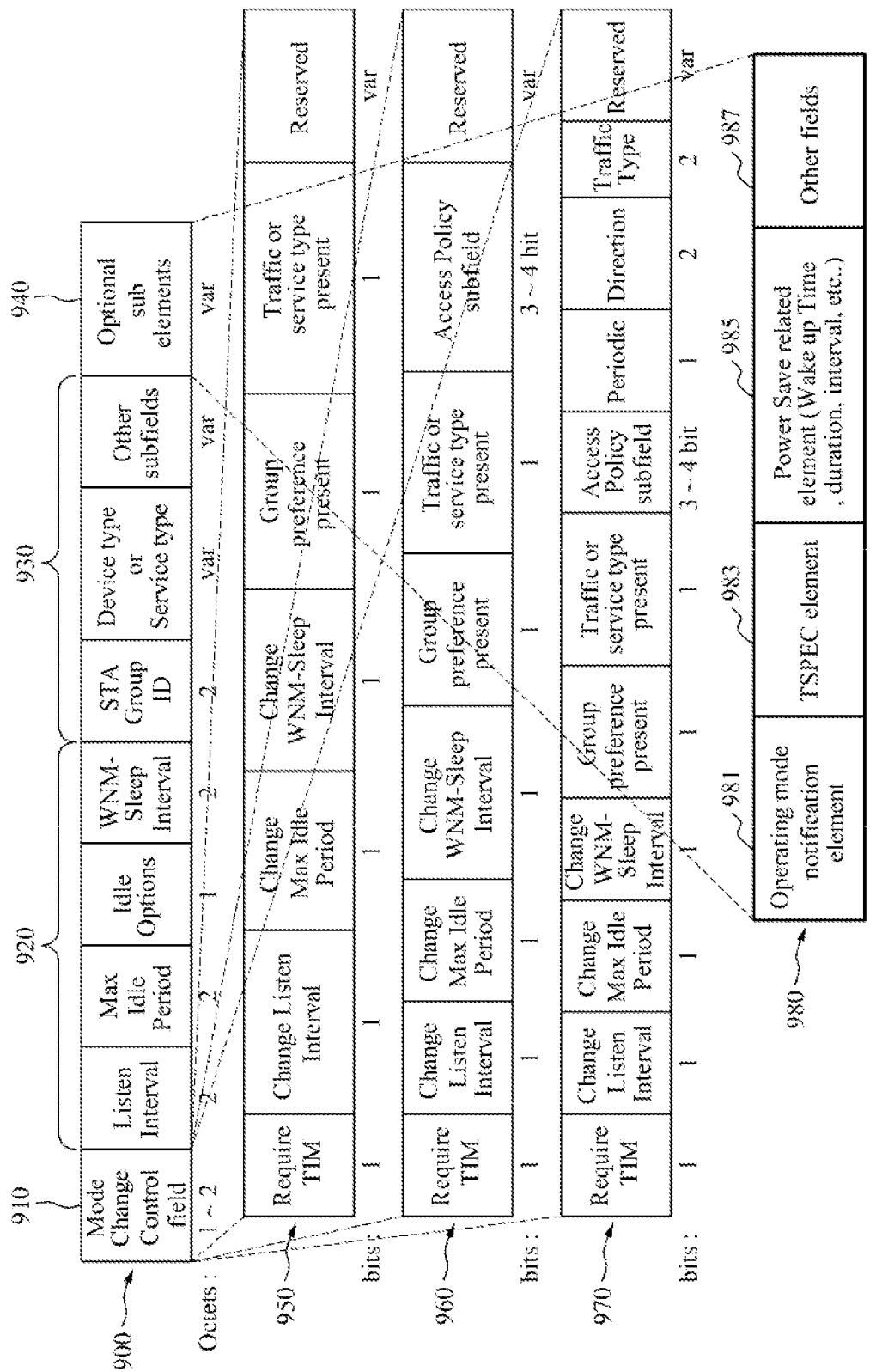
FIG. 9 illustrates various configurations of an operating mode change request frame according to an exemplary embodiment.

FIG. 9 illustrates different configurations of an operating mode change request frame according to an exemplary embodiment.

Referring to FIG. 9, an Operation Mode Change Request field 900 of an AH operating mode change request frame may be divided into fields 910, 920 and 930 including information on a request for an operating mode change and an Optional sub elements field 940 corresponding to Order 4 of FIG. 7.

When a change of a power save parameter of the STA is needed due to a change in an operational environment, the STA may request the change of the power save parameter to the AP through an operating mode change request frame.

The STA may indicate a changed listen interval value in a Listen Interval field. As the listen interval value is greater, the AP may buffer a frame for the STA for a longer time and the STA may maintain the sleep state for a longer time.

The STA may request a change of a maximum idle period to the AP using a Max Idle Period field and an Idle Options field.

The STA may request a change of a sleep interval such as a WNM-sleep interval or wakeup interval if the STA wishes to, and a changed WNM-sleep interval value or wakeup interval value may be indicated in a WNM-Sleep Interval field or Wake Up Interval field.

The Operation Mode Change Request field 900 may include only one information among the listen interval, the maximum idle period and the WNM-sleep interval or wakeup interval.

Alternatively, the Operation Mode Change Request field 900 may include a common value to represent a plurality of interval values. For example, a sleep interval value field may have a representative value a, and the listen interval, the maximum idle period and the WNM-sleep interval or wakeup interval may be obtained by multiplying a by a preset constant.

For instance, the AP may establish rules in the BSS, such as Listen interval=100*a, Max idle period=10000000*a, and WNM-Sleep Interval or Wake Up Interval=1000*a. Here, the STA may indicate the value a in power save parameter information of the Operation Mode Change Request field to transmit to the AP, and the AP may obtain the listen interval, the maximum idle period and the WNM-sleep interval or wakeup interval by multiplying a by a preset constant.

When the STA wishes to transfer to a particular STA group, the STA may explicitly indicate an ID of a desired STA group in an STA Group ID field. The STA group may be implicitly determined by an AID allocated for the STA group in the BSS, and in this case, the STA Group ID field may not need using.

A Device type or Service type field may include information on a device type or a service type used by a device for reference in AID reallocation of the STA.

Other subfields may include sectorization parameters, such as information on a sector group desired by the STA, for example, a sector group ID and a sector ID, which may be used for reference when the AP allocates a sector for the STA or changes a sector of the STA.

A Mode Change Control field 910 may include any one of a first format 950, a second format 960 and a third format 970.

<Details of Subfields of First Format 950>

When the STA wants a TIM operation, the STA may set a Require TIM bit to 1. When the STA wants a non-TIM operation, the STA may set the Require TIM bit to 0.

When the Require TIM bit of the STA is different from that in a previous STA mode, for example, when the STA wishes to change from the non-TIM operation to the TIM operation by setting the Require TIM bit to 1, the AP may perform AID reallocation, group reallocation and slot reallocation in connection with the change of the TIM operation mode of the STA.

When Change Listen Interval is set to 1, a Change Listen Interval field indicates that the STA wishes to set a listen interval to a different value from previous one. When Change Listen Interval is set to 1, Listen Interval of the operating mode change request frame 900 necessarily includes a listen interval value.

A Change Listen Interval field being 0 indicates that the STA may not wish to change the listen interval. Here, the STA does not set the listen interval, and the AP may not need to refer to the listen interval of the Operating Mode Change Request field.

Even though Change Listen Interval is set to 0 as the STA does not wish to change the listen interval, the AP may change the listen interval of the STA and notify the STA of the changed listen interval when the AP transmits the operation mode change response if determining that the change is needed.

Change Max Idle Period set to 1 indicates that the STA wishes to set a maximum idle period to a different value from previous one. When Change Max Idle Period is set to 1, the Operating Mode Change Request field necessarily includes a Max Idle Period subfield and an Idle Options subfield which are set to corresponding values.

Change Max Idle Period set to 0 indicates that the STA does not wish to change the maximum idle period. The STA does not set the Max Idle Period subfield and the Idle Options subfield, and the AP may not need to refer to the Max Idle Period subfield and the Idle Options subfield.

Even though Change Max Idle Period is set to 0 as the STA does not wish to change the maximum idle period, the AP may change the maximum idle period of the STA and notify the STA of the changed maximum idle period when the AP transmits the operation mode change response if determining that the change is needed.

Change WNM-sleep Interval or Change Wakeup Interval set to 1 indicates that the STA wishes to set a WNM-sleep interval or wakeup interval to a different value from previous one. When Change WNM-sleep Interval or Change Wakeup Interval is set to 1, Change WNM-sleep Interval or Change Wakeup Interval of the Operating Mode Change Request field necessarily has a set WNM-sleep interval or wakeup interval value.

Change WNM-sleep Interval or Change Wakeup Interval set to 0 indicates that the STA does not wish to change the WNM-sleep interval or wakeup interval. The STA may not set the WNM-sleep interval or wakeup interval. The AP does not refer to the WNM-sleep interval or wakeup interval of the Operating Mode Change Request field.

Even though Change WNM-sleep Interval or Change Wakeup Interval is set to 0 as the STA does not wish to change the WNM-sleep interval or wakeup interval, the AP may change the WNM-sleep interval or wakeup interval and notify the STA of the changed WNM-sleep interval or wakeup interval when the AP transmits the operation mode change response if determining that the change is needed.

When Max Idle Period, Change WNM-Sleep Interval and WNM-Sleep Interval or Wake Up Interval specify one common value instead of respective values, three Max Idle Period, Change WNM-Sleep Interval and WNM-Sleep Interval or Wake Up Interval fields may be combined into one field.

When the STA wishes to move to a particular STA group, a Group preference preset bit of the Mode Change Control field is set to 1 and an ID of the STA group is clearly included in STA Group ID of the Operating Mode Change Request field.

When the Group preference preset bit is 0, the AP does not refer to STA Group ID of the Operating Mode Change Request field.

When group reallocation is needed for the STA even though the Group preference preset bit is 0, the AP may perform group reallocation. Here, information on the group reallocation may be transmitted to the STA using the operating mode change response.

When the STA group is implicitly determined by the allocated AID in the BSS, the information on the group reallocation may be omitted.

Traffic or service type present may indicate information on a traffic type or service type that the AP refers to in AID reallocation or a service type used by a device.

When power consumption information on a battery powered sensor node and a battery powered smart phone and information on a periodically waking-up sensor node and an event-driven waking-up sensor node are included, the AP may more efficiently perform AID reallocation/STA grouping in consideration power consumption requirements and a wakeup period of the STA.

Part of a Reserved bit may be used to indicate presence or absence of sectorization information including information on an STA-desired sector group, for example, a sector group ID and a sector ID.

<Details of Subfields of Second Format 960>

The second format 960 may further an Access Policy subfield in addition to the subfields of the first format 950.

The Access Policy subfield may indicate a medium access method that the STA wishes to use.

<Details of Subfields of Third Format 970>

The third format 970 includes Periodic, Direction and Traffic Type subfields. The Periodic, Direction and Traffic Type subfields are defined as follow for use.

The Periodic subfield indicates whether traffic of the STA is periodic.

1: Traffic is periodic
0: Traffic is aperiodic or unspecified
Direction (2 bit)
00: Uplink traffic-oriented
10: Downlink traffic-oriented
01: Direct link
11: Bidirectional
Traffic Type
00: AC_BE (Best Effort)-oriented
01: AC_BK (Background)-oriented
10: AC_VI (Video)-oriented
11: AC_VO (Voice)-oriented When the AP has information on STA traffic, such as periodicity, direction (uplink-oriented or downlink-oriented), and a traffic type (video, voice, . . . ), the AP may group STAs with similar traffic characteristics and allocate an AID, thereby more efficiently managing a BSS.

Meanwhile, in FIG. 9, a Reserved bit may be used to indicate presence or absence of sectorization information including information on an STA-desired sector group, for example, a sector group ID and a sector ID.

A reference numeral 980 of FIG. 9 illustrates a configuration of subfields of Optional sub elements 940.

When the STA wishes to change a bandwidth or Nss, transmitting the operating mode change request frame, an Operating mode notification element 981 may be inserted into an Optional sub elements 940.

A TPSEC element 983 may be configured in a format shown in FIG. 12.

Other fields 985 may be used when additional information is needed.

Power Save related element 985 may be used to indicate an element including additional information on power saving.

The STA may transmit information on a preferred wakeup time, a preferred wakeup duration and a wakeup interval of the STA inserted into Power Save related element 985 to the AP. The AP may utilize the information included in Power Save related element 985 in STA grouping and AID allocation and report an actually allowed wakeup time, wakeup duration and wakeup interval of the STA through the operating mode change response.

The STA may transmit operating mode information to the AP not only in a mode change after association but also in association with the AP, so that the operating mode information may be used to set up an initial operation mode of the STA. When the STA transmits desired operating mode setup information to the AP in first association with the AP, the AP may utilize the operating mode setup information in initial grouping/AID allocation of the STA. To this end, the aforementioned medium access preference element including information similar to the operation mode change information of the STA included in the operating mode change request frame may be used. The STA transmits, to the AP, an association request frame including a medium access preference element in association with the AP, and the AP determines whether to allow association of the STA based on the medium access preference element, and transmits, to the STA, operating mode information allowed for the STA to be included in a medium access parameter element of an association response frame if the association is allowed.

Since the information included in the medium access preference element is substantially similar to the information of the Operating Mode Change Request field of the operating mode change request frame, the STA may include an Operating Mode Request field in the association request frame as a form of an information element (IE), instead of the medium access preference element, in the association request.

Figure 14:
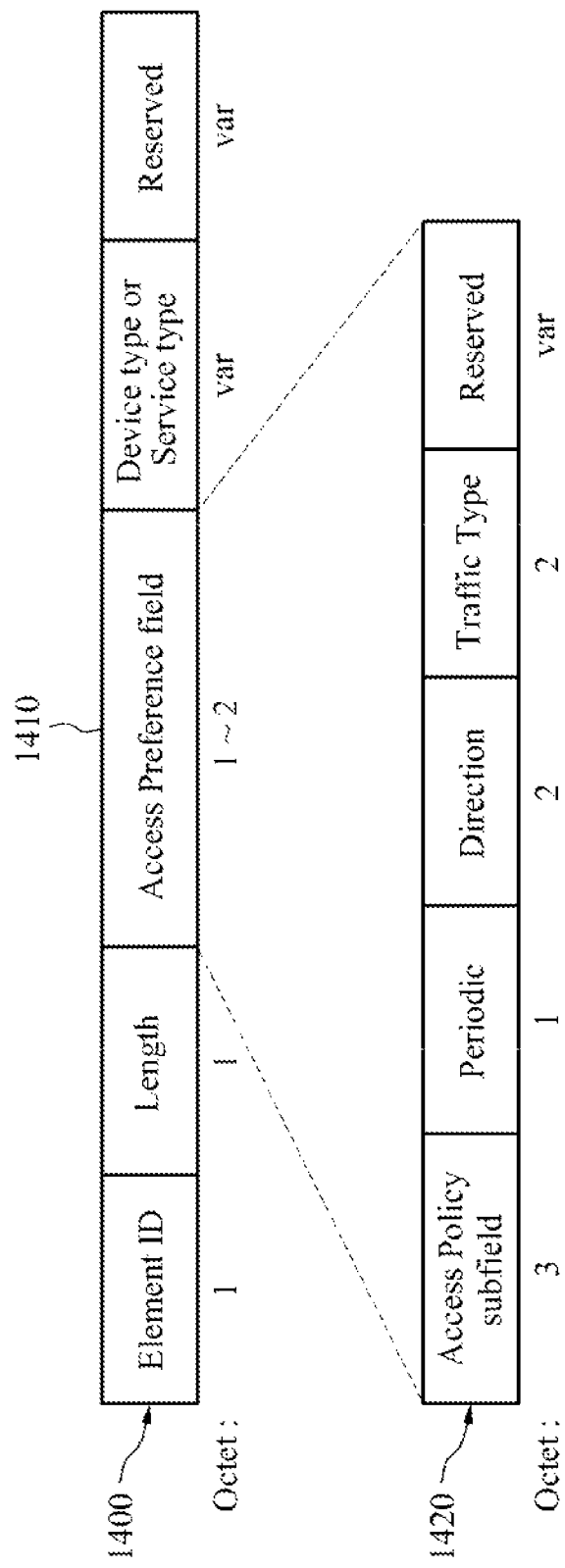
FIG. 14 illustrates a use of a medium access preference element of FIG. 9.

The medium access preference element may have a configuration shown in FIG. 14.

FIG. 10 illustrates a use of the Access Policy subfield of FIG. 9. FIG. 11 illustrates another use of the Access Policy subfield of FIG. 9.

The Access Policy subfield may illustrate a medium access method used by the STA. For example, when the Access Policy subfield uses three bits, each bit may be defined as in FIG. 10.

A first bit means use of enhanced distributed channel access (EDCA), a second bit means use of hybrid coordinator function (HCF) controlled channel access (HCCA), and a third bit means use of channel access of slotted carrier sense multiple access (CSMA) newly defined in IEEE 802.11ah, that is, a channel access method using RAW.

The STA sets a channel access method to use to 1 (a plurality of channel methods may be adopted), and the AP may use the channel access method of the STA in STA grouping, AID allocation and slot allocation. For example, when the STA does not support a slotted method, the AP may allocate the STA to another STA group and may not allocate a slot to the STA.

When a different channel access method is defined other than the slotted method defined in the WLAN system, four bits illustrated in FIG. 4 may be used. When an additional channel access method is supported, definition of a bit may be extended in the same manner.

Figure 13:
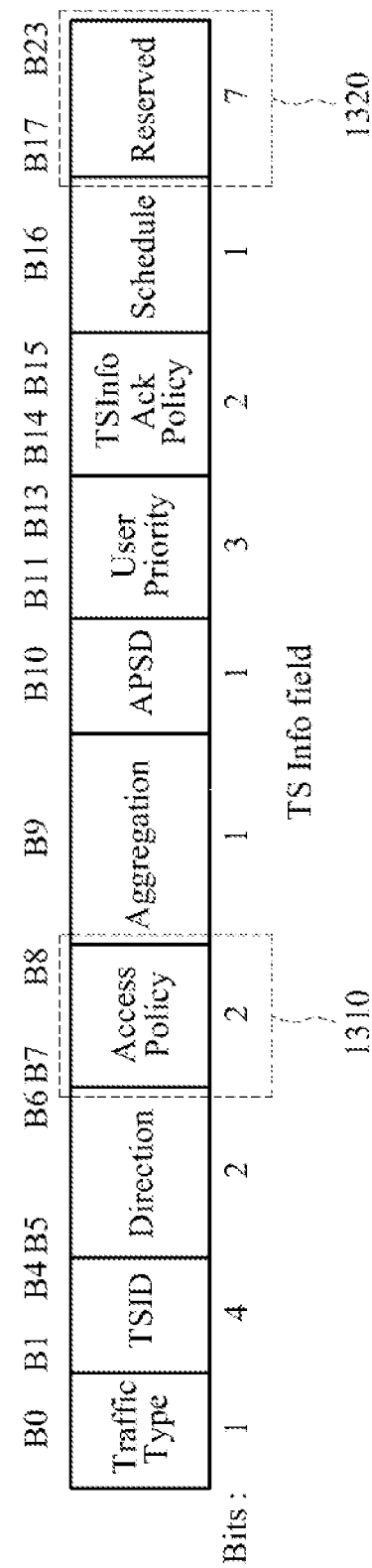
FIG. 13 illustrates a configuration of a TS Info field of FIG. 12.

FIG. 12 illustrates a TSPEC element in accordance with related technology. FIG. 13 illustrates a configuration of a TS Info field of FIG. 12.

The Optional sub element 940 of FIG. 9 may further include elements used for the AP to realize the operating mode of the STA in detail and to effectively allocate a group and an AID for the STA or set up a power save parameter.

For example, the Optional sub element may include a TSPEC element.

The TSPEC element illustrates quality of service (QoS) required by the STA, and the AP may conduct more efficient STA grouping and AID allocation with reference to the QoS.

FIG. 13 illustrates the TS Info field of the TSPEC element.

Access Policy 1310 of the TS Info field is two bits, which illustrates EDCA and HCCA only. Reserved 1320 of the TS Info field may represent Access Policy of FIG. 10 or 11 using additional one to two bits.

When the TSPEC element is included in the Optional sub element and an extended access policy is used for the TSPEC element, the Access Policy subfield of the Mode Change Control field may be omitted.

FIG. 14 illustrates a configuration of the medium access preference element described above.

Fields, such as Access Policy subfield, Periodic, Direction and Traffic Type, included in an Access Preference field 1410 of the medium access preference element 1400 are equivalent to the fields with the same names illustrated in FIG. 9.

The STA may transmit the medium access preference element 1400 to be included in an association request frame to the AP. The AP may properly perform initial grouping and AID allocation for the STA in association of the STA with reference to the TIM operating mode, an access policy and a traffic type of the STA.

Access Preference field 1410 may include subfields as illustrated in a reference numeral 1420.

Power save related optional element 985 illustrated in FIG. 9 may be also included in the association request frame. A Device type or Service type field may illustrate a device type of the STA or a service type used by the STA.

A request for a TIM/non-TIM operation mode may be transmitted to the AP through the operating mode notification element or be expressed with a bit allocated in the association request or with an allocated bit among reserved bits of the Access Preference field 1420.

The medium access preference element may include sectorization parameters, such as STA preferred sector information, for example, a sector group ID or sector ID, which may be used for reference when the AP allocates a sector for the STA or changes a sector. The STA may include sectorization information, such as STA desired optimal sector information, for example, a sector group ID or sector ID, discovered through a sector beacon/NDP type discovery frame, so that the AP may allocate an optimal sector to the STA in association.

FIG. 15 illustrates an action field format of an operating mode change response frame according to an exemplary embodiment.

FIG. 15 shows that an AH operating mode change response frame is defined as an action frame. The action frame may have a different format from that of FIG. 15 as long as it includes information used to transmit a result of an operating mode change.

An AH operating mode change response field is used for the AP to transmit a result of a changed operating mode to the STA. The AH operating mode change response field may report whether the AP allows a request for the change of the TIM mode of the STA.

Further, the AH operating mode change response field notifies the STA of an reallocated AID of the STA. When the STA requests a change of a power save parameter, such as a listen interval, a maximum idle period and a WMN-sleep interval or wakeup interval, the AH operating mode change response field may notify the STA of an actual power save parameter allowed by the AP and transmit changed operation mode information to the STA. Further, when the STA operates in a sectorization mode, the AP may additionally transmit, to the STA, operation mode information on a reallocated sector group for the STA, for example, a sector ID or group ID, and on a sector transmission duration.

Figure 16:
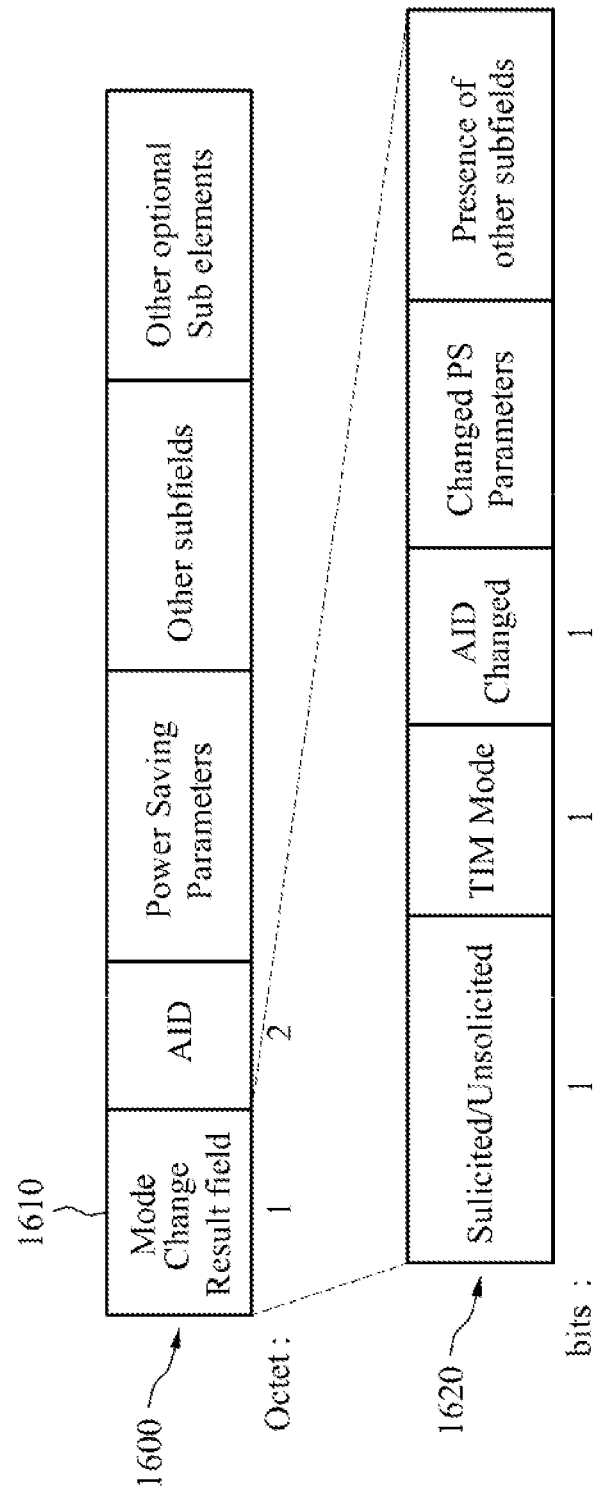
FIG. 16 illustrates a configuration of an operation mode change response field according to an exemplary embodiment.

FIG. 16 illustrates a configuration of an operation mode change response field according to an exemplary embodiment.

Referring to FIG. 16, the operation mode change response field 1600 may include a Mode Change Result field 1610, an AID field and Power Saving parameters.

AID includes an AID value that the AP reallocates to the STA, and the Power Saving parameters illustrate an actual power save parameter value allowed by the AP when the STA requests a change of a power save parameter, such as a listen interval, a maximum idle period and a WNM-sleep interval or wakeup interval.

Other subfields may include sectorization information reported to the STA in operation in a sectorization mode, such as a sector number allocated or reallocated to the STA, a sector ID or a sector group ID, a total number of sectors and a sector duration. Other subfields may be used to first allocate a sector to the STA or to reallocate a sector to the STA.

Mode Change Result field 1610 may include various subfields, for example, in a format as illustrated in a reference numeral 1620.

A Solicited/Unsolicited field illustrates whether an operating mode change response is transmitted as a response to an operating mode change request transmitted by the STA or is for the AP to request an operation mode change even though the STA does not make a mode change request.

TIM Mode illustrates a TIM mode of the STA allowed by the AP, for example, a TIM operation/Non-TIM operation.

AID Changed indicates that an AID is reallocated, and may include a reallocated AID value in the operating mode change response when the AID is reallocated.

Changed PS Parameters may indicate that a power save parameter, such as a listen interval, a maximum idle period and a WNM-sleep interval or a wakeup interval, is changed. When a power save parameter is allowed to be change by the AP, the operating mode change response may include the changed power save parameter allowed by the AP.

Figure 17:
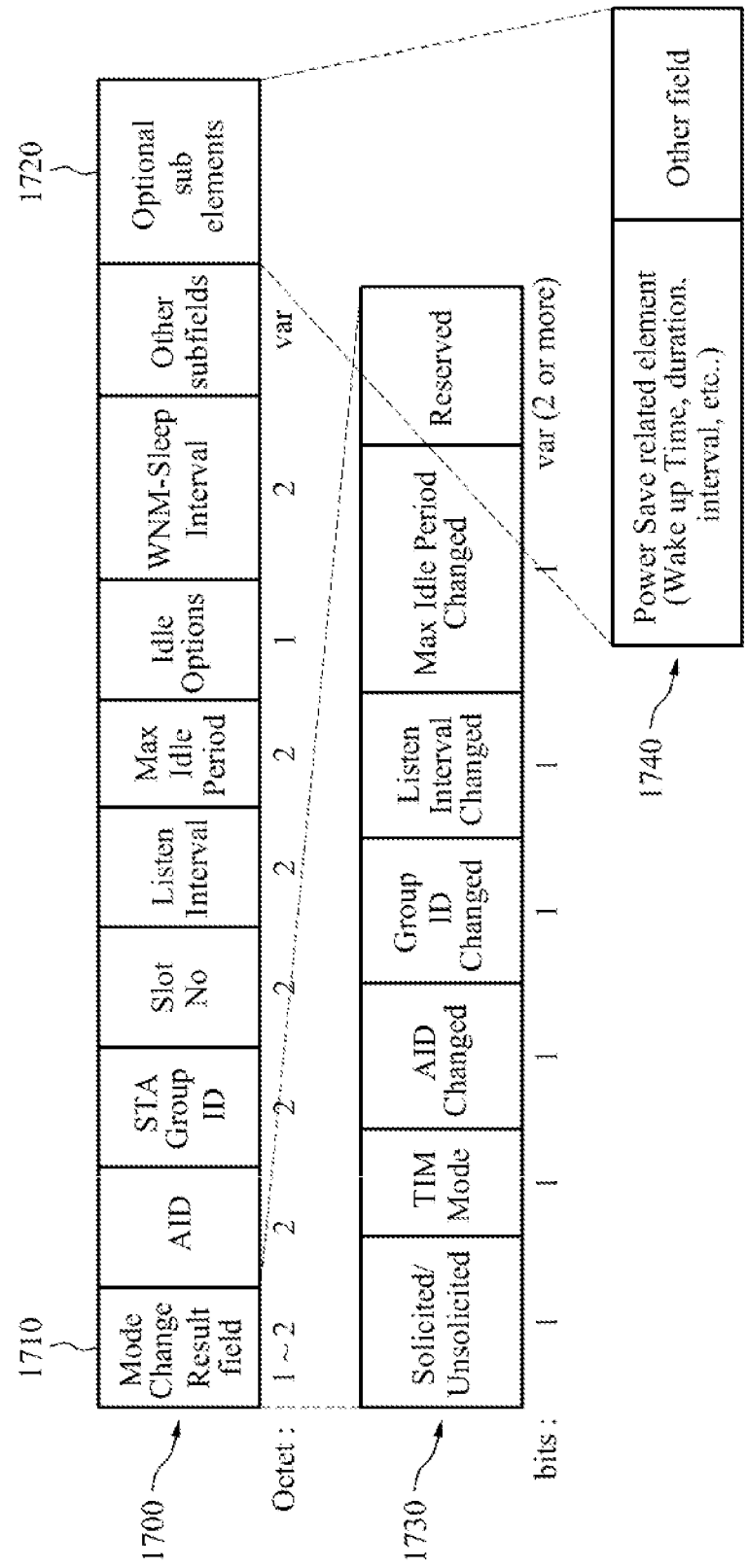
FIG. 17 illustrates a configuration of an operation mode change response field according to another exemplary embodiment.

FIG. 17 illustrates a configuration of an operating mode change response field according to another exemplary embodiment.

Referring to FIG. 17, the operating mode change response field 1700 may include a Mode Change Result field 1710.

An AID subfield includes an AID reallocated by the AP.

An STA Group subfield includes an STA group ID allocated by the AP. Slot No indicates a slot number allocated to the STA when slotted CSMA is used.

When the AID of the STA is determined in the BSS, the STA group ID is implicitly determined. When slotted channel access is managed in a method of separately reporting the slot number, STA Group ID and Slot No may be omitted.

Listen Interval represents a listen interval allowed by the AP for the STA.

Max Idle Period and Idle Options represent information on a maximum idle period allowed by the AP for the STA.

WNM-Sleep interval or Wakeup Interval represents a WNM-sleep interval or wakeup interval allowed by the AP for the STA.

The operation mode change response field 1700 may include only one of Listen Interval, Max Idle Period and, WNM-Sleep Interval or Wakeup Interval.

Alternatively, the operation mode change response field 1700 may include a common value to represent a plurality of interval values. For example, a sleep interval value field may have a representative value a, and the listen interval, the maximum idle period and the WNM-sleep interval or wakeup interval may be obtained by multiplying a by a preset constant.

For instance, the AP may establish rules in the BSS, such as Listen interval=100*a, Max idle period=10000000*a, and WNM-Sleep Interval or Wake Up Interval=1000*a. Here, the AP may indicate the value a in power save parameter information of the Operation Mode Change Response field to transmit to the STA, and the STA may obtain the listen interval, the maximum idle period and the WNM-sleep interval or wakeup interval by multiplying a by a preset constant.

Other subfields may include sectorization information reported to the STA in operation in a sectorization mode, such as a sector number allocated or reallocated to the STA, a sector ID or a sector group ID, a total number of sectors and a sector duration. Other subfields may be used to first allocate a sector to the STA or to reallocate a sector to the STA.

A Mode Change Result field 1710 may include various subfields, for example, in a format as illustrated in a reference numeral 1730.

Solicited/Unsolicited set to 1 may represent Unsolicited. In a state that the AP does not explicitly receive an operating mode change request from the STA, the AP may use an unsolicited response when the AP reallocates an STA group, reallocates an AID of the STA and changes an STA group considering a current condition of the BSS, for example, that additionally divided groups are needed as a great number of particular STAs join the AP or that a number of groups needs to decrease as a great number of STAs leave the BSS.

Solicited/Unsolicited set to 0 may represent solicited. Here, Solicited/Unsolicited represents a response to an operating mode change request. When the STA requests a mode change to the AP using an operating mode notification frame, the AP may respond using a solicited operating mode change response.

<TIM Mode>

TIM Mode represents a TIM operation mode allowed for the STA. When the AP allows a request for a non-TIM operation or TIM operation made by the STA, a TIM operation (set to 1) or non-TIM operation (set to 0) bit may be set up.

When the request is not allowed so that a different TIM operation mode from requested by the STA is set up, for example, when the STA requests the non-TIM operation but the AP does not support the non-TIM operation and thus sets up the TIM operation, the STA accords follows the TIM operation mode set up by the AP. When the STA is allowed to request a TIM mode change only with respect to a TIM mode supported by the AP, the STA requests the TIM mode change only when the AP supports the TIM mode, and thus a TIM mode request by the STA may be always accepted by the AP. In this case, a TIM mode subfield is not used, so that a one bit-reduced frame format may be designed.

<AID Changed>

AID Changed is set to 1 when the AP changes an AID. When an AID Changed bit is set to 1, the Operating Mode Change Response field necessarily includes an AID subfield with a valid AID set.

When the AP does not change an AID of the STA, an original AID of the STA may be included in the AID subfield and transmitted. In this case, the AID Changed bit may be omitted.

Group ID Changed is set to 1 when the AP changes an STA group of the STA. When a Group ID Changed bit is set to 1, the Operating Mode Change Response field necessarily includes an STA Group ID subfield with a valid Group ID set. When slotted channel access is operated in a manner of implicitly determining an STA Group ID when the AID of the STA is determined in the BSS, Group Changed may be omitted.

Listen Interval Changed is set to 1 when the AP changes a listen interval of the STA. Here, a Listen Interval field includes a listen interval value allowed by the AP.

Max Idle Period Changed is set to 1 when the AP changes a maximum idle period of the STA. Here, Max Idle Period and Idle Options subfields include a value allowed by the AP.

WNM-Sleep Interval Changed or Wake Up Interval Changed is set to 1 when the AP changes a WNM-sleep interval or a wakeup interval of the STA. Here, a WNM-Sleep Interval or Wake Up Interval field includes a WNM-sleep interval or wakeup interval value allowed by the AP.

Other subfields 1720 may indicate that a sector is allocated or reallocated to the STA. In this case, Other subfields may include sectorization parameter, such as a sector number allocated or reallocated to the STA, a sector ID or a sector group ID, a total number of sectors and a sector duration. Other subfields may be used to first allocate a sector to the STA or to reallocate a sector to the STA.

Optional sub elements 1720 may include an element including additional information on power saving. When the STA transmits the element including the additional information on power saving as in 985 of FIG. 9, inclusive of a preferred wakeup time, a preferred wakeup duration and a wakeup interval of the STA, transmitting an operating mode change request, the AP may use the element in grouping and AID allocation for the STA and transmit an actual wakeup time, an actual wakeup duration and an actual wakeup interval allowed for the STA to be included in Optional sub elements of an operating mode change response to the STA.

Figure 18:
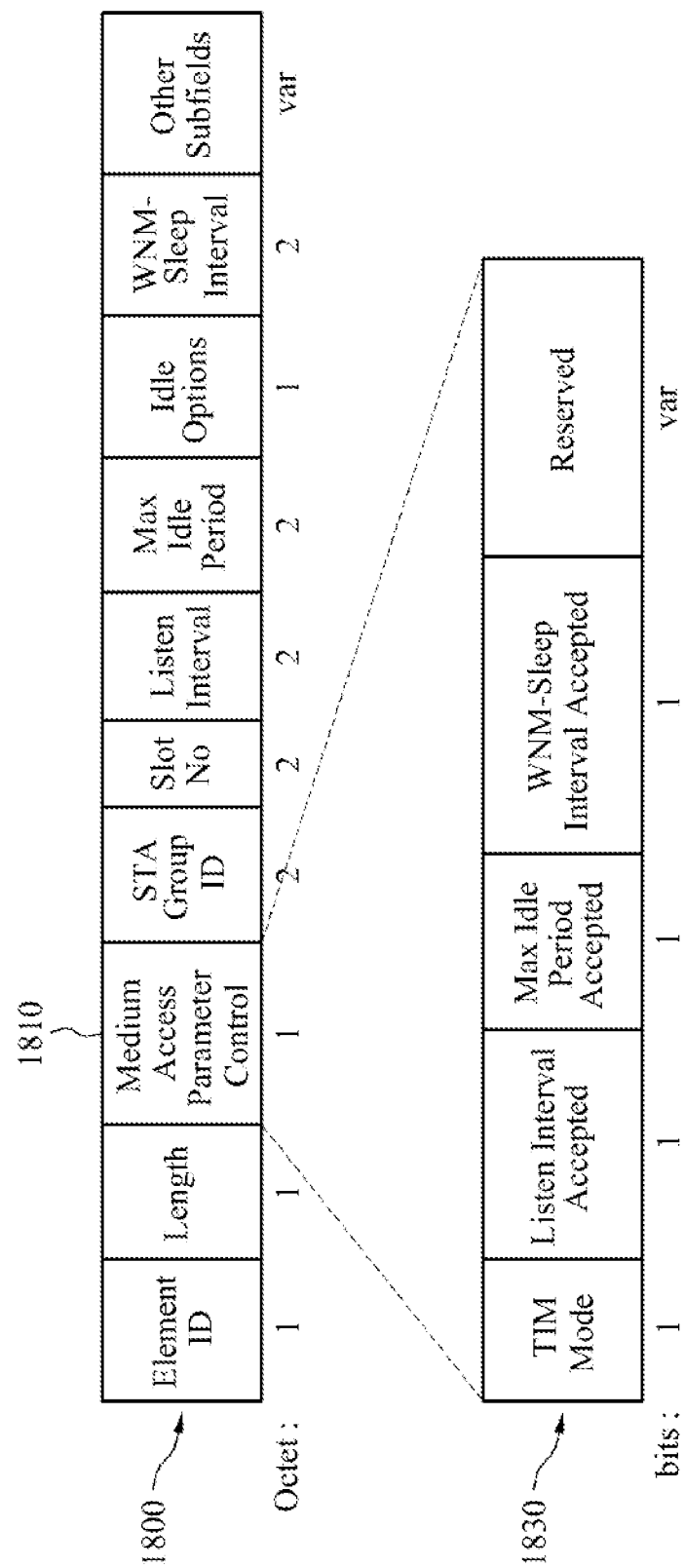
FIG. 18 illustrates a configuration of a medium access parameter element according to an exemplary embodiment.

When the AP receives the association request including the medium access preference element 1400 of FIG. 14 from the STA, the AP may respond to the STA with the association response including the medium access parameter element of FIG. 18 or 19. By transmitting the association response frame including the medium access parameter element to the STA, the STA may set up an initial operating mode in the BSS. The medium access parameter element is an element including similar information to operation mode change information of the STA included in the operating mode change response frame allowed by the AP. When the medium access parameter element is included in the association response, the STA may recognize a TIM mode of the STA allowed by the AP at association time, an AID of the STA, power save parameters including a sleep duration, such as a listen interval or wakeup interval, an allocated sector group of the STA, such as a sector ID or sector group ID, and duration information on a relevant sector if the STA uses sectorization, and immediately set up an operating mode at association time based on the element.

Since the information included in the medium access parameter element is substantially similar to the information of the Operating Mode Change Response field of the operating mode change response frame, the STA may include an Operating Mode Response field in the association response frame as a form of an IE, instead of the medium access parameter element, in the association response.

FIG. 18 illustrates a configuration of a medium access parameter element according to an exemplary embodiment. FIG. 19 illustrates a configuration of a medium access parameter element according to another exemplary embodiment.

The medium access parameter element 1800 may include a medium access parameter control subfield 1810. The medium access parameter control subfield 1810 may include various subfields as in 1830.

TIM Mode represent a TIM operation mode supported by the AP. When the AP allows a request for a non-TIM operation or TIM operation made by the STA, a TIM operation (set to 1) or non-TIM operation (set to 0) bit may be set up.

Listen Interval Accepted set to 1 means that a listen interval requested by the STA is accepted by the AP. Here, the STA may not refer to Listen Interval of the medium access parameter element.

Max Idle Period Accepted set to 1 means that a maximum idle period requested by the STA is accepted by the AP. In this case, the STA may not refer to Max Idle Period and Idle options of the medium access parameter element.

WNM-Sleep Interval Accepted or Wake up interval Accepted set to 1 means that a WNM-sleep interval requested by the STA is accepted by the AP. In this case, the STA may not refer to WNM-Sleep Interval or Wake up interval of the medium access parameter element.

When Listen Interval Accepted, Max Idle Period Accepted and WNM-Sleep Interval Accepted or Wake up interval Accepted are not 1, which means that the AP set different values from requested by the STA, values set by the AP are verified with reference to relevant subfields.

When the STA operates in a sectorization mode, the AP may further transmit, to the STA, sectorization related operation mode information, for example, a reallocated sector group of the STA, such as a sector ID or group ID, and a sector transmission duration, included in Other Subfield of the medium access parameter.

FIG. 19 illustrates a medium access preference element without a Medium Access Parameter Control subfield of FIG. 18.

In this instance, acceptance of a TIM mode requested by the STA may be indicated by allocating another bit of an association response or be identified through an error code of the association response.

Figure 20:
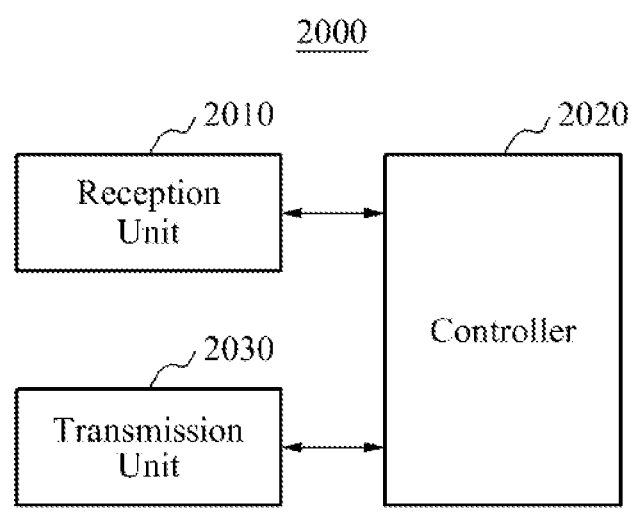
FIG. 20 illustrates a schematic configuration of an AP according to an exemplary embodiment.

FIG. 20 illustrates a schematic configuration of an AP according to an exemplary embodiment.

Referring to FIG. 20, the AP 2000 includes a reception unit 2010, a controller 2020 and a transmission unit 2030.

The reception unit 2010 receives an operating mode notification frame including information on a bandwidth used by an STA, information on a number of used spatial streams and information on a change of a TIM mode.

The reception unit 2010 may receive an operating mode change request frame including the information on the change of the TIM mode of the STA, a request for a change of a power save parameter and information on a change of a service type of the STA.

The controller 2020 determines whether to allow the change of the TIM mode of the STA. Further, the controller 2020 determines whether to change the TIM mode of the STA and whether to change the power save parameter. In addition, the controller 2020 determines a group change for the STA and AID reallocation based on the change of the TIM mode of the STA, the change of the power save parameter of the STA and the information on the service type of the STA.

The transmission unit 2030 transmits, to the STA, an operating mode change response frame including information on a reallocated AID of the STA.

Also, the transmission unit 2030 transmits, to the STA, an operating mode change response frame including at least one of information on a TIM mode allowed by the AP 2000, a changed power save parameter of the STA allowed by the AP 2000, information on the reallocated AID by the AP 2000 and allocation information on a sectorization group for the STA allocated or reallocated by the AP 2000.

Figure 21:
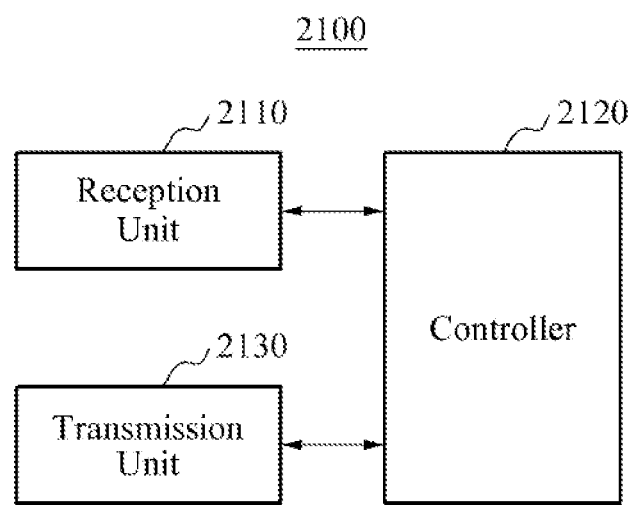
FIG. 21 illustrates a schematic configuration of an STA according to an exemplary embodiment.

FIG. 21 illustrates a schematic configuration of an STA according to an exemplary embodiment.

Referring to FIG. 21, the STA 2100 includes a reception unit 2110, a controller 2120 and a transmission unit 2130.

The transmission unit 2130 transmits, to the AP, an operating mode notification frame including information on a used bandwidth, information on a number of used spatial streams and information on a change of a TIM mode.

Further, the transmission unit 2130 transmits, to the AP, an operating mode change request frame including information on a change of a TIM mode of the STA, information on a request for a change of a power save parameter and information on a change of a service type.

The reception unit 2110 receives, from the AP, an operating mode change response including information on a reallocated AID.

Also, the reception unit 2110 receives, from the AP, an operating mode change response frame including at least one of information on a TIM mode allowed by the AP, information on a power save parameter of the STA allowed by the AP, information on the reallocated AID by the AP 2000 and allocation information on a sectorization group for the STA allocated or reallocated by the AP 2000.

The controller 2120 performs the change of the TIM mode based on the information included in the operating mode change response frame.

Further, the controller 2120 may perform a change of at least one of the TIM mode and the power save parameter based on the information included in the operating mode change response frame.

Here, the reception unit 2110 receives, from the AP, the operating mode notification frame of the AP including information on a change of an operating mode of the AP, and the controller 2120 may communicate with the AP based on the operating mode notification frame of the AP.

The methods according to the exemplary embodiments may be recorded in computer-readable media as program instructions to be implemented by various computers. The media may also include, alone or in combination, the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and higher level code that may be executed by a computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. An operating mode change method of a wireless local area network (WLAN) system, the method comprising:
    transmitting, by a station (STA) to an access point (AP), a request frame comprising at least one of information on a change of traffic indication map (TIM) modes, information on a change of a listen interval, or information on a change of a service type of a STA;
    receiving, from the AP, a response frame comprising information on an association identification (AID) for the STA allocated by the AP and information on a listen interval for the STA allocated by the AP; and
    performing an operation based on the information on the AID included in the response frame,
    wherein the change of TIM modes includes a switch from a TIM mode to a non-TIM mode, or a switch from the non-TIM mode to the TIM mode.

2. The method of claim 1, further comprising receiving, from the AP, an operating mode notification frame comprising information on a change of an operating mode of the AP before the transmitting of the request frame to the AP or after the performing of the change.

3. The method of claim 2, wherein the operating mode notification frame of the AP comprises information on whether the AP supports all kinds of STAs, supports only a sensor node, or supports only an offloading device.

4. The method of claim 2, wherein the operating mode notification frame of the AP comprises information on a basic service set (BSS) type supported by the AP, and the BSS type comprises at least one of a sensor mode, an offloading mode, and a mixed mode.

5. The method of claim 1, wherein the response frame further comprises at least one of an allowed TIM mode, information on a changed listen interval, or information on a group change by the change of the TIM modes.

6. The method of claim 1, wherein when the STA makes a request for association with the AP, the information included in the request frame is included in the request for association and transmitted to the AP to request setup of an operating mode at a time when the STA is associated with the AP.

7. The method of claim 6, wherein operating setup request information included in the request for association comprises at least one of a TIM mode desired by the STA, a power save parameter including a sleep duration corresponding to a listen interval or a wakeup interval, or a traffic type or a service type of the STA.

8. The method of claim 1, wherein when the AP receives an association request including the information included in the request frame from the STA, the AP determines whether to associate with the STA, and transmits an association response including the information included in the response frame to the STA, if association is allowed, so that the STA sets up an operating mode at a time of association.

9. The method of claim 8, wherein operating setup response information included in the association response comprises at least one of a TIM mode allowed by the AP for the STA, an AID of the STA, or a power save parameter including a sleep duration corresponding to a listen interval or wakeup interval.

10. The method of claim 1, wherein an AID of the STA is reallocated by the AP, when at least one of the change of TIM modes or the change of the listen interval of the STA is performed at the STA, and
    wherein the reallocated AID included in the response frame is used by the STA as a new AID of the STA.

11. The method of claim 1, wherein the AID of the STA is reallocated by the AP based on the information on the change of the service type of the STA.

12. The method of claim 1, wherein the performing further includes performing at least one of the change of the TIM modes or the change of the listen interval based on the information included in the response frame.

13. An operating mode change method of a wireless local area network (WLAN) system, the method comprising:
    receiving, by an access point (AP) from a station (STA), a request frame comprising at least one of information on a change of traffic indication map (TIM) modes of the STA, information on a change of a listen interval, or information on a change of a service type of the STA; and
    transmitting, to the STA, a response frame comprising information on an association identification (AID) for the STA allocated by the AP and information on a listen interval for the STA allocated by the AP,
    wherein the change of TIM modes includes a switch from a TIM mode to a non-TIM mode, or a switch from the non-TIM mode to the TIM mode.

14. A station (STA) of a wireless local area network (WLAN) system, the STA comprising:
    a transmission unit to transmit, to an access point (AP), a request frame comprising at least one of information on a change of traffic indication map (TIM) modes of the STA, information on a change of a listen interval, or information on a change of a service type of the STA;
    a reception unit to receive, from the AP, a response frame comprising information on an association identification (AID) for the STA allocated by the AP and information on a listen interval for the STA allocated by the AP; and a controller to perform an operation based on the information on the AID included in the response frame, wherein the change of TIM modes includes a switch from a TIM mode to a non-TIM mode, or a switch from the non-TIM mode to the TIM mode.

15. The STA of claim 14, wherein the reception unit receives, from the AP, an operating mode notification frame comprising information on a change of an operating mode of the AP before the transmitting of the request frame to the AP or after the performing of the change.

16. The STA of claim 14, wherein the response frame further comprises at least one of an allowed TIM mode, information on a changed listen interval, or information on a group change by the change of the TIM modes.

17. The STA of claim 14, wherein the controller is further configured to perform at least one of the change of the TIM modes or the change of the listen interval based on the information included in the response frame.

18. An access point (AP) of a wireless local area network (WLAN) system, the AP comprising:

a reception unit to receive a request frame comprising at least one of information on a change of traffic indication map (TIM) modes of a station (STA), information on a change of a listen interval, or information on a change of a service type of the STA; and a transmission unit to transmit, to the STA, a response frame comprising information on an association identification (AID) for the STA allocated by the AP and information on a listen interval for the STA allocated by the AP, wherein the change of TIM modes includes a switch from a TIM mode to a non-TIM mode, or a switch from the non-TIM mode to the TIM mode.

\* \* \* \* \*